(12) United States Patent
Ohanian

(10) Patent No.: US 11,464,206 B2
(45) Date of Patent: Oct. 11, 2022

(54) PORTABLE PET WASHING STATION

(71) Applicant: Ara Ohanian, Doraville, GA (US)

(72) Inventor: Ara Ohanian, Doraville, GA (US)

(*) Notice: Subject to any disclaimer, the term of this patent is extended or adjusted under 35 U.S.C. 154(b) by 202 days.

(21) Appl. No.: 16/809,286

(22) Filed: Mar. 4, 2020

(65) Prior Publication Data
US 2021/0274751 A1 Sep. 9, 2021

(51) Int. Cl.
*A01K 13/00* (2006.01)

(52) U.S. Cl.
CPC .................... *A01K 13/001* (2013.01)

(58) Field of Classification Search
CPC .... A01K 13/001; A01K 13/003; A01K 13/00; E04H 15/40; A61D 7/00; A61D 11/00; A61H 9/00; A61H 33/02
USPC .......................................... 119/600
See application file for complete search history.

(56) References Cited

U.S. PATENT DOCUMENTS

| | | | |
|---|---|---|---|
| 2,538,850 A | 1/1951 | Simms | |
| 3,749,064 A * | 7/1973 | Weinstein | A01K 13/002 |
| | | | 119/664 |
| 3,772,714 A * | 11/1973 | Sealby | A61H 33/02 |
| | | | 4/619 |
| 4,020,796 A | 5/1977 | Grifa | |
| 4,056,078 A | 11/1977 | Blafford et al. | |
| 4,083,328 A | 4/1978 | Baker | |
| 4,382,424 A | 5/1983 | Altissimo | |
| 4,407,234 A | 10/1983 | Kleman | |
| 4,505,229 A | 3/1985 | Altissimo | |
| 4,527,512 A | 7/1985 | Sugiura | |
| 4,549,502 A | 10/1985 | Namdari | |
| 4,724,553 A * | 2/1988 | Bianchi | A61H 9/00 |
| | | | 4/615 |
| 4,782,792 A | 11/1988 | Anthony et al. | |
| 4,796,567 A | 1/1989 | Allan et al. | |
| 4,930,453 A | 6/1990 | Laliberte | |
| 5,193,487 A | 3/1993 | Vogel | |
| 5,213,064 A | 5/1993 | Mondine et al. | |
| 5,230,304 A * | 7/1993 | Santoro | A01K 1/0254 |
| | | | 119/497 |
| 5,243,931 A | 9/1993 | McDonough | |

(Continued)

FOREIGN PATENT DOCUMENTS

| | | | | |
|---|---|---|---|---|
| EP | 0 200 975 B1 | 1/1992 | | |
| WO | WO-8601978 A * | 10/1985 | ............. | A01K 13/00 |

(Continued)

OTHER PUBLICATIONS

European Search Report EP21159106 dated Jul. 21, 2021, 9 pages.

*Primary Examiner* — Ebony E Evans
(74) *Attorney, Agent, or Firm* — Fish & Richardson P.C.

(57) ABSTRACT

This document described portable pet washing stations. In one aspect, a pet washing station includes a bottom portion that extends from a first side of the pet washing station to a second side of the pet washing station opposite of the first side of the pet washing station. The pet washing station also includes a cover portion connected to the bottom portion and that forms a top portion and side wall portions. The cover portion extends from the first side of the pet washing station to the second side of the pet washing station. The pet washing station includes a coil spring disposed between layers of the cover portion. The coil spring extends from the first side of the pet washing station to the second side of the pet washing station.

19 Claims, 15 Drawing Sheets

(56) References Cited

U.S. PATENT DOCUMENTS

| | | | |
|---|---|---|---|
| 5,279,257 A * | 1/1994 | Temby | A01K 13/001 |
| | | | 119/676 |
| 5,448,966 A | 9/1995 | McKinnon et al. | |
| D379,209 S * | 5/1997 | Coddington, Jr. | D21/419 |
| 5,632,231 A | 5/1997 | Moore | |
| 5,678,511 A | 10/1997 | Day | |
| 5,722,349 A | 3/1998 | Wolgamuth | |
| 5,724,918 A | 3/1998 | Navalon-Chicote | |
| 5,738,044 A | 4/1998 | Gaylinn | |
| 5,769,029 A | 6/1998 | Marshall | |
| 5,832,874 A | 11/1998 | Ravin | |
| 6,029,610 A | 2/2000 | Ramsey et al. | |
| 6,508,200 B1 | 1/2003 | Remis | |
| 6,688,257 B2 | 2/2004 | Lee | |
| D501,063 S * | 1/2005 | Bertoli | D30/108 |
| 7,040,254 B1 | 5/2006 | Rucker et al. | |
| 7,107,937 B1 | 9/2006 | Anderson | |
| 7,421,978 B2 | 9/2008 | Price | |
| 7,662,012 B2 * | 2/2010 | Wright | A63H 37/005 |
| | | | 446/34 |
| 7,854,688 B2 * | 12/2010 | Zheng | A63B 9/00 |
| | | | 482/35 |
| 7,921,812 B1 | 4/2011 | Carrillo | |
| 8,186,307 B2 | 5/2012 | Moharram et al. | |
| 8,371,248 B2 | 2/2013 | Redick | |
| 8,413,610 B1 | 4/2013 | Fultz | |
| D769,550 S | 10/2016 | Oxboel et al. | |
| 9,675,047 B2 | 6/2017 | Carter | |
| 10,051,836 B1 * | 8/2018 | Tannis | A01K 29/00 |
| 10,143,182 B1 | 12/2018 | Ferro | |
| 10,165,754 B2 | 1/2019 | Wright | |
| 2001/0022159 A1 * | 9/2001 | Zangle | A01K 15/025 |
| | | | 119/707 |
| 2002/0030052 A1 * | 3/2002 | Joo-Tai | D06F 95/002 |
| | | | 220/9.2 |
| 2005/0034748 A1 | 2/2005 | Gadd | |
| 2006/0169219 A1 | 8/2006 | Yaghmai et al. | |
| 2007/0034162 A1 * | 2/2007 | Kellogg | A01K 31/14 |
| | | | 119/431 |
| 2007/0074674 A1 | 4/2007 | Miller | |
| 2007/0095301 A1 | 5/2007 | Boylan | |
| 2010/0288205 A1 | 11/2010 | Makarian et al. | |
| 2011/0132274 A1 | 6/2011 | Cagle | |
| 2015/0059658 A1 | 3/2015 | Whitsett | |
| 2016/0128302 A1 | 5/2016 | Stauber et al. | |
| 2018/0132451 A1 | 5/2018 | Arndt et al. | |
| 2020/0128788 A1 | 4/2020 | Zheng | |

FOREIGN PATENT DOCUMENTS

| | | | | |
|---|---|---|---|---|
| WO | WO8601978 A1 | 4/1986 | | |
| WO | WO0200014 A1 | 1/2002 | | |
| WO | WO-2005025304 A1 * | 3/2005 | | A01K 13/001 |
| WO | WO-2012013385 A1 * | 2/2012 | | A47K 3/325 |
| WO | WO2012013385 A1 | 2/2012 | | |

* cited by examiner

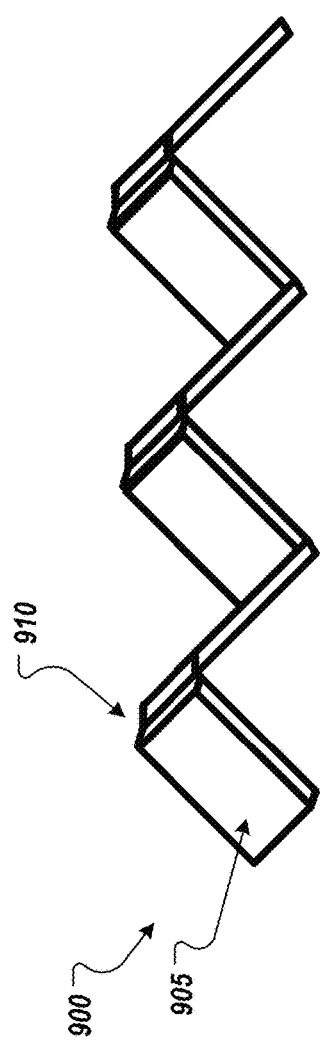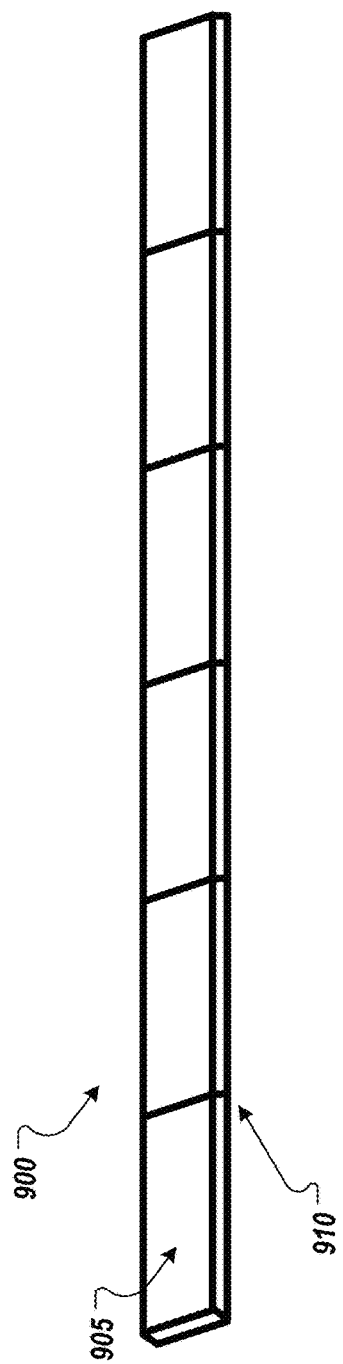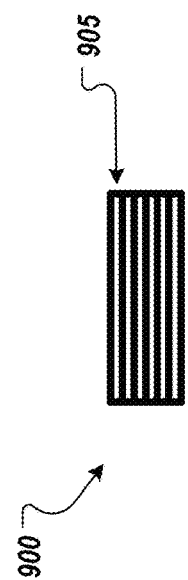
FIG. 9A
FIG. 9B
FIG. 9C

PORTABLE PET WASHING STATION

BACKGROUND

Bathing a pet is often a difficult task at home and especially when traveling. At home, many people bathe their pets in their bathtub or shower. This can result in huge messes due to the pets splashing in the water and attempting to shake themselves dry during and after a bath. In addition, some bathtubs have large walls that can make it difficult to lift a heavy, reluctant pet over to get the pet into the bath. When traveling or on the go in general, access to a bath may not be available. It may be difficult to maintain control of a pet when attempting to bathe a pet outside without a room to confine the pet.

SUMMARY

In general, one innovative aspect of the subject matter described in this specification can be embodied in pet washing stations that include a bottom portion that extends from a first side of the pet washing station to a second side of the pet washing station opposite of the first side of the pet washing station. The pet washing station includes a cover portion connected to the bottom portion and that forms a top portion and side wall portions. The cover portion extends from the first side of the pet washing station to the second side of the pet washing station. The pet washing station includes a coil spring disposed between layers of the cover portion. The coil spring extends from the first side of the pet washing station to the second side of the pet washing station.

These and other embodiments can each optionally include one or more of the following features. In some aspects, the coil spring is further disposed between layers of the bottom portion. The coil spring can be a tension spring configured to pull the first side of the pet washing station and the second side of the pet washing station together. The pet washing station can include a foldable floor removably inserted into the pet washing station and onto the bottom portion of the pet washing station such that, when expanded, the foldable floor prevents the coil spring from collapsing the pet washing station.

In some aspects, the coil spring is hollow and includes a plurality of holes for air to flow and a fitting or adapter for receiving a drying device. The coil spring can be a compression spring configured to push the first side of the pet washing station away from the second side of the pet washing station. The pet washing station can include one or more hook and loop fasteners that hold the first side and the second side together when the pet washing station is collapsed.

In some aspects, the coil spring includes a helical spring. The coil spring includes multiple flat sections that run along the bottom portion and multiple curved sections that run along the cover portion. In some aspects, the pet washing station includes a door on at least one of the first side or the second side. The door can include an expandable hole.

In some aspects, the pet washing station includes water outlets disposed along the side walls. The coil spring can be hollow and include a fitting for receiving a water hose. The water outlets are formed in the coil spring.

In some aspects, the pet washing station includes one or more expandable holes disposed along the cover portion. The cover portion can include one or more sleeve holes and, for each sleeve hole, a sleeve that extends into the pet washing station from the sleeve hole.

In some aspects, the cover portion includes one or more glove holes and, for each glove hole, a glove that extends into the pet washing station from the glove hole. The pet washing station can include holes in the bottom portion.

In some aspects, the pet washing station includes a scrubber that includes a pair of wrist straps attached to an outside surface of a side wall and a wash cloth attached to an inside surface of the side wall. The pet washing station can include suction cups attached to the bottom portion. The pet washing station can include a leash attached to the bottom portion or the cover portion.

In general, another innovative aspect of the subject matter described in this specification can be embodied in methods for manufacturing portable pet washing stations that include attaching a first fabric of a cover portion of the portable pet washing station to a second fabric of a bottom portion of the pet washing station, installing a coil spring into at least the first fabric of the cover portion wherein the coil spring extends from a first side of the pet washing station to a second side of the pet washing station, and attaching each end of the coil spring to corresponding ends of at least one of the cover portion or the bottom portion.

Particular embodiments of the subject matter described in this specification can be implemented so as to realize one or more of the following advantages. Pet washing stations described in this document can collapse into a compact form that is small and easy to carry. For example, a pet washing station can include a coil spring disposed within a fabric housing that causes the pet washing station to collapse when another object (e.g., a floor of the pet washing station) is not preventing the coil spring from recoiling.

The pet washing stations can include various apertures and/or embedded cleaning devices that enable users to apply water to a pet and to use their hands, washcloths, or gloves to bathe the pet. For example, a pet washing station can include gloves inside the station with openings from outside the station for users to put their hands into to bathe a pet without the user getting wet. In another example, the pet washing station can include water outlets, e.g., nozzles, jets or holes in a water tube, that spray water on the pet. The water outlets can be part of the frame, e.g., attached to or formed in the coil spring, making the pet washing station lighter and/or more compact that include a separate water spraying system. This also makes it easier to travel with as the entire pet washing station, including the water sprayers, can be a single, integrated, and collapsible unit.

The structure of the pet washing stations in combination with the apertures and/or cleaning devices prevent the pet from escaping the pet washing station while also being fully cleaned, thereby preventing messes caused by a wet pet shaking off water of itself outside of the pet washing station. The pet washing stations can include features that prevent the pet from escaping while also keeping the pet calm, such as windows that adjust in size to enable various sized pets to stick their heads out while being bathed or a leash attached to the pet washing station.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 9A, 9B, and 9C are illustrations of a foldable floor for a portable pet washing station.

Like reference numbers and designations in the various drawings indicate like elements.

DETAILED DESCRIPTION

Figure 1:
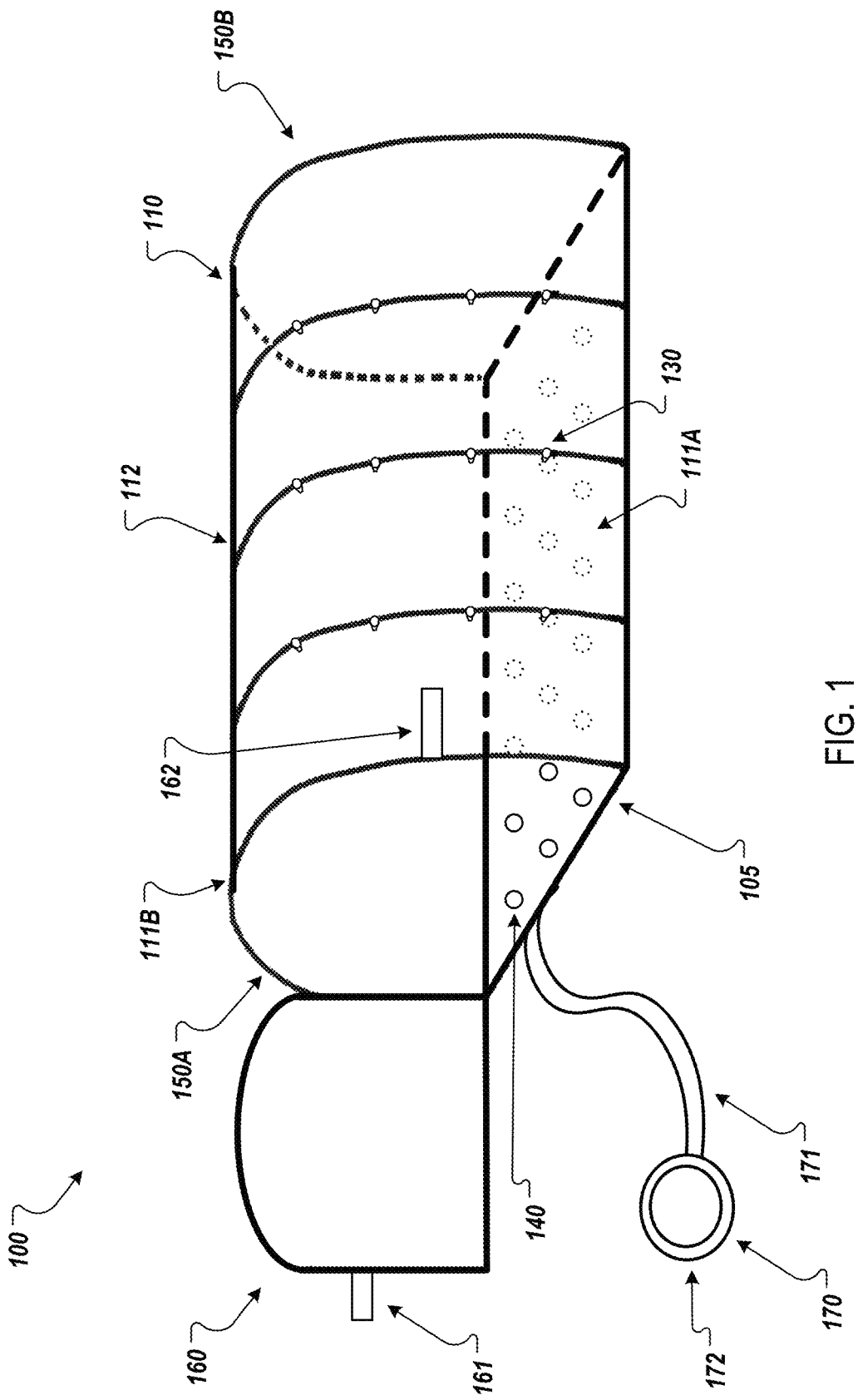
FIG. 1 is an illustration of an example portable pet washing station.

Portable pet washing stations described in this document can collapse for storage and travel and expand when used to bathe a pet, such as a dog, cat, or other small animal. When expanded, the pet washing station can be shaped in the form of a tunnel having a curved or semi-circle top and either a flat or curved bottom. For example, some pet washing stations described in this document have a flat surface that lays on the floor, ground, or other surface and some have a circular shape that can flatten when a pet is in the pet washing station. Other shapes, e.g., rectangular or cubicle, are also possible.

The bottom surface, walls, and top of the pet washing station can be made of a fabric, such as nylon, that is flexible (e.g., can fold easily) and water resistant (e.g., repels water). The fabric can be transparent (or at least translucent or semitransparent) to enable the user to see the pet while bathing the pet. This allows the pet washing station to collapse and expand and quickly dry after use. The bottom, walls, and top can be integral or attached to each other, e.g., using stitching or another attachment mechanism. In some implementations, the fabric can include multiple layers, e.g., at least an outside layer facing outside of the pet washing station and an inside layer facing the inside of the pet washing station. In this way, the inside layer can include holes for nozzles or jets disposed between the two layers to spray water on a pet inside of the pet washing station.

The pet washing station can include a coil spring disposed within the fabric, e.g., between two layers of the fabric, that causes the pet washing station to collapse when another object (e.g., a floor of the pet washing station) is not preventing the coil spring from recoiling. The coil spring can be a helical spring or similar to a helical spring. For example, the coil spring can be in the shape of the tunnel, e.g., round along the walls and top portion and flat along the bottom surface. In another example, the coil spring can be round but flexible such that the portions of the coil spring that run along the bottom of the pet washing station flatten by the weight of a pet (or the pet washing station itself or another object) when the pet washing station is lying on a surface and a pet is in the station.

In another example, the pet washing station can include a compression spring designed to resist compression. In this example, the user can collapse the pet washing station by pushing the two sides of the pet washing station together, e.g., by pushing the two lateral ends of the pet washing station together. The pet washing station can include attachment mechanisms, e.g., hook and loop fasteners, that hold the two sides together. The user can release the attachment mechanisms to enable the compression spring to naturally expand the pet washing station for bathing a pet in the pet washing station.

The pet washing station can also include holes along the sides and the top portion that allows a user to insert the end of a hose and spray water onto the pet inside of the pet washing station. These holes can be arranged in various locations so that the user can spray water at different angles to completely clean the pet.

The pet washing station can include holes on the bottom surface that allows water to drain from the pet washing station. The pet washing station can also include suction cups at the bottom to hold the pet washing station in place.

The pet washing station can include holes on one or both sides and/or the top portion that enable the user to reach into the pet washing station and wash the pet. These holes can be elastic to expand and contract the size of the hole, e.g., for various sized arms and to prevent water from splashing out of the pet washing station. These holes can include gloves or sleeves that extend inside of the pet washing station that enable the user to wash the pet, e.g., without getting wet. The gloves can also be thick protective gloves that protect the user from bites when used with potentially aggressive pets.

The pet washing station can include a door on the front and/or back of the pet washing station. The door(s) can be closed using hook and loop fasteners or another appropriate locking mechanism. A door can include a hole, e.g., an elastic hole, for the pet to stick its head out of the pet washing station during baths. Using an elastic hole allows the hole to be adjusted based on the pet's neck to prevent water from splashing out of the pet washing station, keep the pet inside of the pet washing station, and keep the pet calm during baths by allowing the pet to sticks its head out of the pet washing station.

FIG. 1 is an illustration of an example portable pet washing station 100. The pet washing station 100 includes a flat bottom portion 105 and a curved cover portion 110 that forms the side walls 111A and 111B and top portion (or roof) 112 of the pet washing station 100. The flat bottom portion 105 and rounded cover portion 110 can be integral (e.g., made of a single piece of fabric or other material). In another example, the cover portion 110 can be attached to the bottom portion 105, e.g., using stitching, adhesives, or another connection mechanism. The cover portion 110 and the bottom portion 105 can be made of a flexible and/or waterproof (or water resistant) material, such as a nylon material, rubber, plastic, polyester, microfiber, a material coated with a waterproof or water resistant materials, or another appropriate material. The cover portion 110 and the bottom portion 105 can be made of the same material or a different material. The cover portion 110 (and optionally the bottom portion 105) can be transparent to enable the user to see the pet.

The pet washing station 100 includes water outlets 130 disposed along the inside of the walls 111A and 111B (and optionally the top) of the pet washing station 100. The water outlets can be nozzles of water jets that spray water into the pet washing station 100. For example, the pet washing station 100 can include water tubes that run within the fabric to each water outlet 130. The water tubes can connect to a main water tube that includes a fitting for receiving the end of a hose. A user can attach the end of the hose to the fitting to spray water through the water outlets and onto a pet. In some implementations, the water outlets are simply holes in the water tubes and the water pressure causes the water to spray onto the pet.

In some implementations, the water outlets 130 are part of a frame of the pet washing station 100. For example, as described in more detail below, the pet washing station 100 can include a coil spring that defines the shape of the pet washing station 100. The coil spring can be hollow to enable water to flow through the coil spring. The coil spring can also include water outlets (e.g., holes, jets, or nozzles) that spray water onto a pet inside of the pet washing station 100. The water outlets can be arranged to correspond to the locations of respective holes in the inside fabric of the pet washing station 100 so that the water flows out of the walls and onto the pet. For example, a nozzle for each hole can be inserted through its hole and held in that position, e.g., using an elastic hole that expands to go around the nozzle, but collapses into a slot behind the nozzle to prevent the nozzle from retreating through the hole. One end of the coil spring can include a fitting for receiving the end of a water hose.

In some implementations, the cover portion 110 includes one or more slots along the walls 111A and 111B and optionally along the top portion 112. In this example, the slots can replace the water outlets 130 and be located in the same locations designated for the water outlets in FIG. 1 and the other figures. The slots can be thin cutouts of the cover portion 110 that can be opened to put the end of a water hose into the pet washing station 110 to spray water on a pet that is inside the pet washing station 110. For example, the slots can be wide enough to allow the end of a water hose through each slot. The slots can be formed in way to prevent water from splashing out of the slots when a hose is not placed into the slot. For example, the top of each slot can touch the bottom of each slot and a user can open the slot by pushing the top portion of the slot up and/or the bottom portion of the slot down if the cover portion 110 is made of a flexible material.

In another example, the cover portion 110 can include, for each slot, an overhang that is attached inside of the pet washing station 100 and covers the slot. The overhang can be attached above the slot and hang down to cover the slot. The bottom of the overhang may not be attached to the cover portion 110, allowing the user to push the overhang out of the way when putting the end of a hose through the slot.

In this example, the slots are arranged in several vertical lines from one side 111A to the other side 111B. Other arrangements of the slots, e.g., along horizontal lines, in a single vertical or horizontal line, diagonal across one or both sides 111A and 111B, etc. are also possible.

The water outlets 130 and slots are optional. In some implementations, rather than having slots or water outlets 130, a user can place the end of the hose into the pet washing station 100 though one of the sides 150A or 150B, e.g., by opening the door 160. As described below, a door or side walls of a pet washing station can include holes that a user can put the end of a hose through.

The bottom portion 105 also includes holes 140. These holes 140 allow water to drain from the pet washing station 100. The holes 140 can be arranged throughout the bottom portion 105 or only in particular areas to focus drainage in those areas. The bottom portion 105 can be placed flat on a flat surface when washing a pet.

The pet washing station 100 can be open on one or both sides 150A and 150B. The pet washing station 100 can also include a door 160 on one or both sides 150A and 150B of the pet washing station 100. In this example, the pet washing station 100 includes a door 160 on the side 150A, while the side 150B is closed. The door 160 (or closing on the other side) can be the same material as the cover portion 110 and the bottom portion 105, or a different material. In this example, the door 160 has the same shape as the opening on the side 150A such that the door 160 can extend from the bottom of the opening to the top of the opening and from one side of the opening to the other side of the opening. In this way, when shut, the door 160 completely closes the opening on the side 150A. In other examples, the door 160 may not extend all the way to the top 112 of the pet washing station 100, e.g., leaving a window for the pet to stick its head out when inside of the pet washing station 100.

The pet washing station 100 can include an attachment mechanism that enables a user to close the door 160. In this example, the pet washing station 100 includes a hook and loop fastener that includes a fabric with small hooks and one fabric with small loops. For example, one fabric 161 attached to the door 160 can include small hooks and another fabric 162 attached to the side of the pet washing station 100 can include small loops, or vice versa. Other appropriate attachment mechanisms, such as a string and loop, a single hook and single loop, snaps, buttons, zippers, adhesives, etc. can also be used. The fastener can vary based on the size of the pet washing station and the size of the pet that can be washed in the pet washing station 100 as some fasteners may be more capable than others of maintaining larger pets.

In this example, the pet washing station 100 also includes an optional leash 170. The leash includes a collar 172 and a cord 171 that is attached to the pet washing station 100. In other examples, the leash 170 can include a cord 171 and a clip that clips onto the pet's collar to connect the cord to the pet's collar. The leash 170 can be used to maintain a pet inside or at least near the pet washing station 100, while also giving the pet some freedom to move around before, during, and/or after a bath. This can keep the pet calm while also preventing the pet from getting away and making a mess when wet or soapy.

Figure 2A:
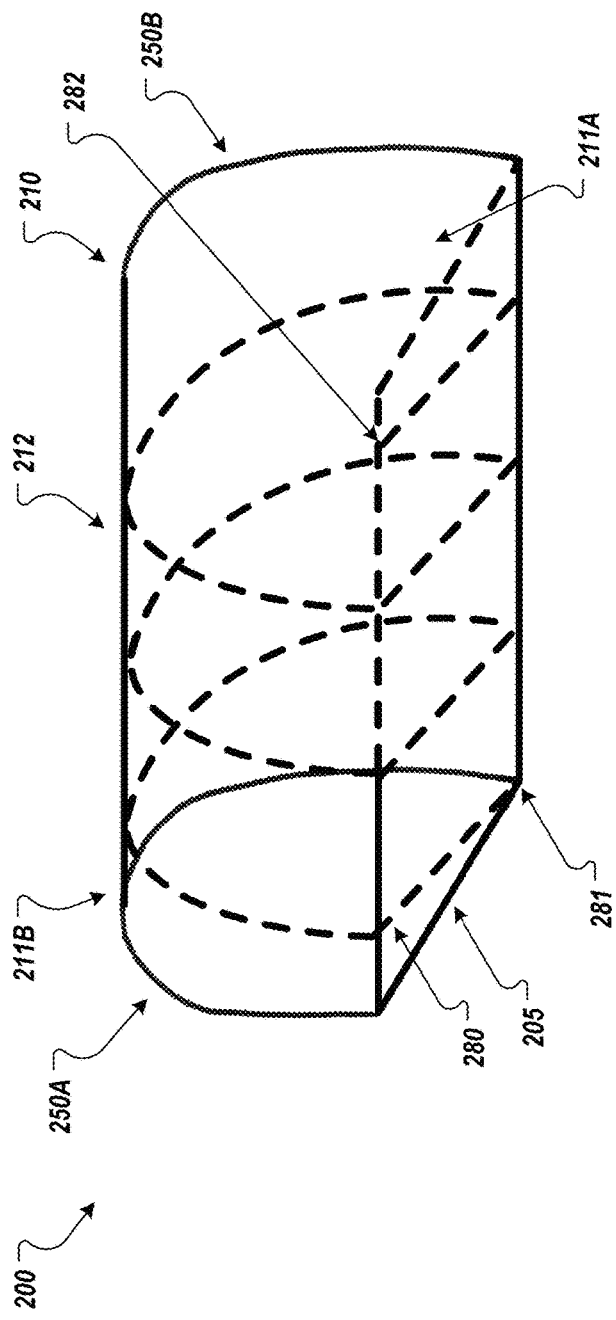
FIGS. 2A and 2B are illustrations of another example portable pet washing station.
Figure 2B:
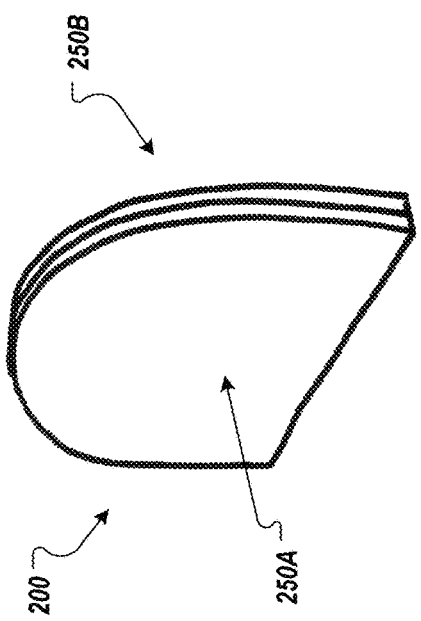

FIGS. 2A and 2B are illustrations of another example portable pet washing station 200. These illustrations show example features of pet washing stations that enable the pet washing stations to expand for bathing a pet and collapsed for storage or travel. The pet washing station 100 of FIG. 1 and example pet washing stations described below can include the same or similar features.

Similar to the pet washing station 100 of FIG. 1, the pet washing station 200 includes a flat bottom portion 205 and a curved cover portion 210 that forms the side walls 211A and 211B and top portion 212 of the pet washing station 200. The cover portion 210 and the bottom portion 205 can be also made of a flexible and/or waterproof material, such as a nylon or other material, as described above.

The pet washing station 200 includes a coil spring 280. The coil spring 280 can extend from one side 250A of the pet washing station 200 to the other side 250B of the pet washing station 200. The coil spring 280 can be disposed within the fabric of the cover portion 210 and the bottom portion 205. For example, the coil spring 280 can be embedded between two or more layers of the fabric. The two or more layers can be made of the same material or different materials. For example, the inner layer may be waterproof or water resistant, while the outer layer is not waterproof or water resistant. One end 281 of the coil spring 280 can be attached securely to the fabric and the other end 282 of the coil spring 280 can also be attached securely to the fabric.

In another example, the coil spring 280 can be alternatingly passed through one or more layers of the fabric at multiple locations along the length of the pet washing station 200 and the coil spring 280. This can distribute the tension of the coil spring 280 to multiple parts of the pet washing station 200. In another example, the internal side of the fabric can include loops along the length of the fabric. The coil spring 280 can pass through or be attached to each loop for similar distribution of the tension. This can prevent tears in the fabric.

In this example, the coil spring 280 has a shape that is similar to or that matches the shape of the pet washing station 200. That is, the coil spring 280 is round along the sides and top, but flat along the bottom portion 205 of the pet washing station. In other implementations, the coil spring 280 can have a helical shape. For example, the coil spring 280 can be a helical spring. In another example, the coil spring 280 can be a helical spring made of a flexible material such that the bottom portion flattens by the weight of a pet when the pet is in the pet washing station 200.

In another example, the coil spring 280 can run back and forth along the cover portion 210 without extending into the bottom portion 205. For example, instead of looping through the bottom portion 205, when the coil spring 280 reaches an end of the cover portion 210 adjacent to the bottom portion 205 (e.g., where one of the sidewalls 211A or 211B meets the bottom portion 205), the coil spring 280 can reverse direction and traverse the cover portion 210 again. The coil spring 280 can extend back and forth from a point at which the sidewall 211A meets the bottom portion 205 to a point at which the sidewall 211B meets the bottom portion 205 from one side 250A of the pet washing station 200 to the other side 250B of the pet washing station 200.

The coil spring 280 can be a tension spring that resists stretching. With no tension applied to the coil spring 280, the coil spring 280 would pull the sides 250A and 250B of the pet washing station 200 together into a collapsed form, as shown in FIG. 2B. A user can expand the pet washing station 200 by pulling the sides 250A and 250B apart, which applies tension to the coil spring 280. The user can pull the sides 250A and 250B apart and secure the pet washing station 200 in its expanded form, as shown in FIG. 2A. As described below, a floor can be inserted into the pet washing station 200 to prevent the coil spring 280 from recoiling.

The user can then bathe a pet in the expanded pet washing station 200. When finished, the user can remove the floor from the pet washing station 200, clean and dry the pet washing station 200, if necessary, and push the sides 250A and 250B back together. The coil spring 280 can be configured such that removing the floor does not cause the pet washing station 200 to suddenly collapse. Instead, the coil spring 280 can be configured with a small amount of tension, e.g., by having less than a threshold spring rate, such that the coil spring 280 keeps the pet washing station 200 in its collapsed form when put into that form by a user and gently pulls the side 250A and 250B together when the floor is removed. The coil spring 280 can be made of metal, plastic, or another appropriate material.

In another example, the coil spring 280 can be a compression spring designed to resist compression. Without external pressure, e.g., by a user, the compression spring would cause the pet washing station 200 to expand. The user can compress the coil spring 280 by pushing the sides 250A and 250B towards each other to put the pet washing station 200 into collapsed form. As described in more detail below with reference to FIG. 13, a pet washing station can include fasteners that prevent the coil spring 280 from expanding the pet washing station.

Figure 3:
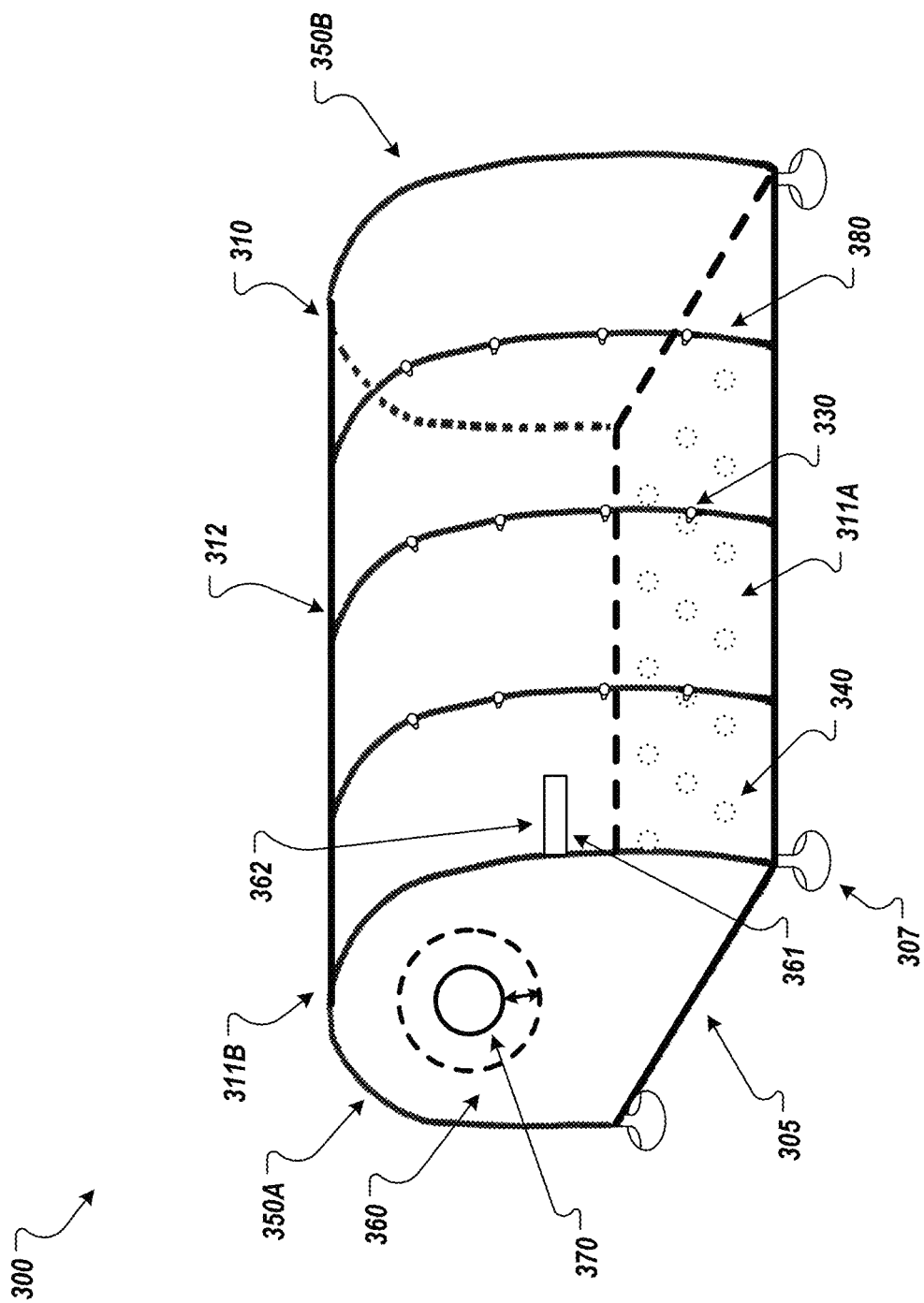
FIG. 3 is an illustration of another example portable pet washing station.

FIG. 3 is an illustration of another example portable pet washing station 300. The pet washing station 300 includes a flat bottom portion 305, a curved cover portion 310 that forms the side walls 311A and 311B and top portion 312, a door 360, a hook and loop fastener 361 and 362 for closing the door 360, holes 340 on the bottom portion 305, a coil spring 380 (only partially visible in FIG. 3) and water outlets 330 along the walls 311A and 311B. The features can be the same as, or similar to, the corresponding features of the pet washing station 100 of FIG. 1.

In this example, the water outlets 330 are nozzles attached to or formed in the coil spring 380. That is, the coil spring 380 can be a hollow tube in which water can flow from a hose to each of the water outlets 330. The coil spring 380 can include water hose fitting at one end of the coil spring 380 for connecting a water hose to the coil spring 380. The water outlets 330 can be disposed on the wall 311A, the wall 311B, and/or the top portion 312. In other example, the water outlets 330 can be formed in a separate water tube that runs along the walls 311A and 311B and/or the top portion 312. The water outlets 330 are optional, as slots or other holes in the pet washing station 300 can also be used to spray water onto a pet.

In some implementations, the coil spring 380 (or other tube) can be used to blow drying air on the pet in a similar manner. For example, the water outlets 330 can instead be air outlets. A user can point a drying device into one end of the coil spring 380 and the coil spring 380 can distribute the air within the pet washing station 300. In another example, one end of the coil spring 380 can include a fitting or adapter for connecting to the end of the drying device from which air blows such that the user does not have to hold the drying device while drying the pet.

The pet washing station 300 also includes an expandable hole 370 in the door 360. The expandable hole 370 allows a pet being washed in the pet washing station 300 to put its head through the hole and see outside of the pet washing station 300. This can keep the pet calm during the bath and allow the pet to interact with the person(s) washing the pet. By being expandable, a user can adjust the size of the expandable hole 370 based on the size of the pet. If the expandable hole 370 is too large, a smaller pet can escape through the expandable hole 370.

The expandable hole 370 can be made expandable by using an elastic material to form the circumference of the expandable hole 370. In another example, the expandable hole 370 can be a cinch-style opening that can be opened and closed using a drawstring. In this way, the hole 370 can be completely closed when appropriate.

The pet washing station 300 can include a door 360 with an expandable hole on one side of the pet washing station 300, e.g., side 350A as shown in FIG. 3, or on both sides 350A and 350B. In another example, the side 350A can include the door 360 with the expandable hole 370 and the other side 350B can be closed off with an expandable hole. This can allow two pets to be washed in the pet washing station 300 at the same time and both can stick their heads out of the pet washing station 300.

The pet washing station 300 also includes suction cups 307 on the bottom corners of the pet washing station 300. The suction cups 307 are used to prevent the pet washing station 300 from moving after being expanded. For example, a user can expand the pet washing station 300 and apply each suction cup to the floor, ground, or other surface.

Figure 4:
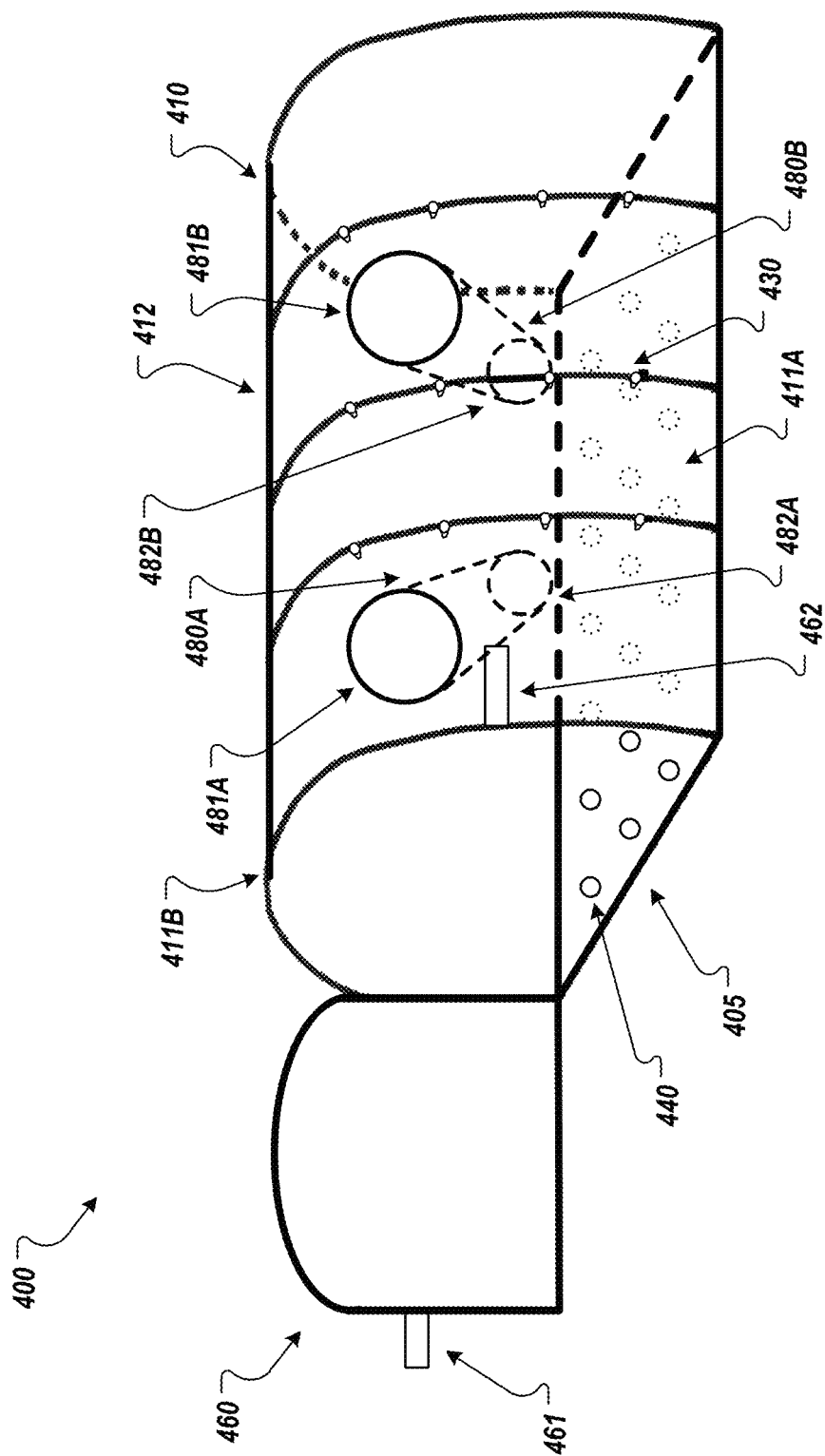
FIG. 4 is an illustration of another example portable pet washing station.

FIG. 4 is an illustration of another example portable pet washing station 400. The pet washing station 400 includes a flat bottom portion 405, a curved cover portion 410 that forms the side walls 411A and 411B and top portion 412, a door 460, a hook and loop fastener 461 and 462 for closing the door 460, holes 440 on the bottom portion 405, and water outlets 430 along the walls 411A and 411B. The features can be the same as, or similar to, the corresponding features of the pet washing station 100 of FIG. 1.

The pet washing station 400 also includes a pair of sleeves 480A and 480B on one or both lateral sides of the pet washing station 400. The sleeves 480A and 480B extend into the pet washing station 400 from respective holes 481A and 481B in the side wall 411A of the pet washing station 400. The sleeves 480A and 480B also include respective holes 482A and 482B on the other side of the sleeves 480A and 480B. This allows users to put their hands into the pet washing station 400 to wash a pet that is inside the pet washing station 400. The user's hands can stick out of the holes 482A and 482B of the sleeves 480A and 480B to wash the pet.

As the sleeves 480A and 480B hang inside of the pet washing station 400 when not in use, e.g., when a user does have their arms in the sleeves, water cannot easily splash out of the pet washing station 400 through the sleeves 480A and 480B. Thus, this configuration reduces or prevents splashing.

The sleeves 480A and 480B can be made of a waterproof material, e.g., nylon. The sleeves 480A and 480B can be made of the same material as the pet washing station 400 or of a different material. The sleeves 480A and 480B can be attached to the side wall 411A of the pet washing station 400, e.g., using stitching or another appropriate attachment mechanism.

Figure 5:
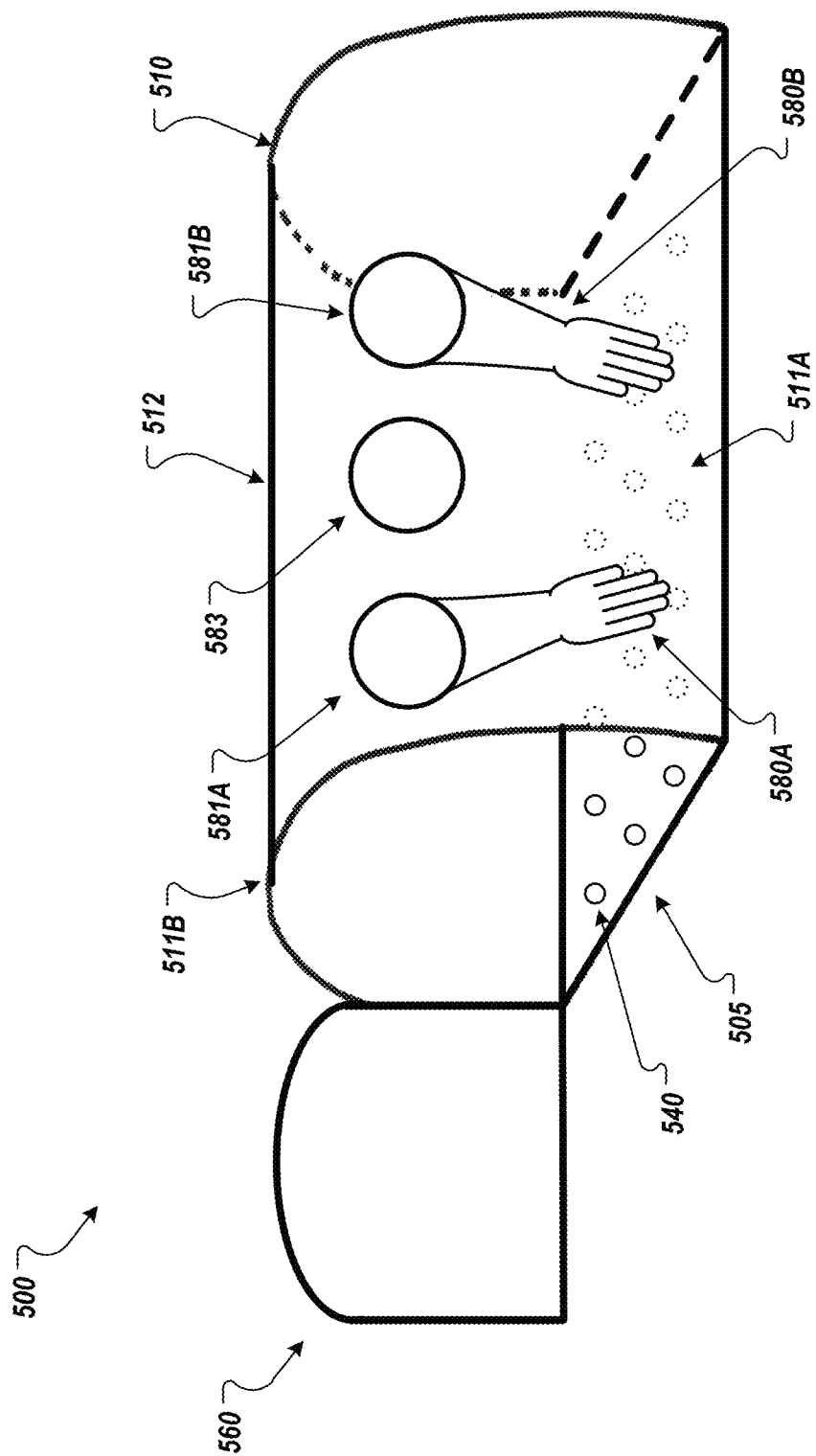
FIG. 5 is an illustration of another example portable pet washing station.

FIG. 5 is an illustration of another example portable pet washing station 500. The pet washing station 500 includes a flat bottom portion 505, a curved cover portion 510 that forms the side walls 511A and 511B and top portion 512, a door 560, a hook and loop fastener (not shown for clarity of other features) for closing the door 560, holes 540 on the bottom portion 505, and water outlets (also not shown for clarity of other features) along the walls 511A and 511B. The features can be the same as, or similar to, the corresponding features of the pet washing station 100 of FIG. 1.

The pet washing station 500 also includes a pair of gloves 580A and 580B on one or both lateral sides of the pet washing station 500. The gloves 580A and 580B extend into the pet washing station 500 from respective holes 581A and 581B in the side wall 511A of the pet washing station 500. The gloves 580A and 580B enable a user to wash a pet without getting their hands wet or soapy. Similar to the sleeves 480A and 480B, the gloves 580A and 580B can prevent water from splashing out of the pet washing station 500.

The gloves 580A and 580B can be made of a waterproof or water resistant material, e.g., nylon. The gloves 580A and 580B can be made of the same material as the pet washing station 500 or of a different material. The gloves 580A and 580B can be attached to the side wall 511A of the pet washing station 500, e.g., using stitching or another appropriate attachment mechanism.

The pet washing station 500 also includes a drying hole 583. The drying hole 583 can be an expandable hole, e.g., using cinch-style openings or elastic, that is configured to enable a user to dry a pet using a drying device, e.g., a hair dryer. For example, the drying hole 583 can be completely closed to prevent water from escaping the pet washing station 500 while a pet is being washed. The user can then open the drying hole 583 and place an end of a drying device through the hole to dry the pet. For example, the drying device can be a portable hair dryer or other device that blows air. In this way, the drying device can be packed and transported separately from the pet washing station 500. This also allows for other drying devices to be used, e.g., without carrying a drying device with the pet washing station. For example, a user can use a blow dryer provided by a hotel with the pet washing station 500 rather than packing and traveling with a drying device.

In some implementations, the drying hole 583 can be formed using a stronger material, e.g., a stronger plastic or rubber than the fabric of the pet washing station 500. For example, the pet washing station 500 can include a border around the perimeter of the drying hole that is made of the stronger material. The use of the stronger material enables the pet washing station 500 to support the drying device, e.g., with or without the user holding the drying device. Although the drying hole 583 is shown only in FIG. 5, each pet washing station described in this document can be configured to have one or more drying holes arranged along one or more walls or top portion of the pet washing station.

The pet washing station 500 can also include a detachable dryer holder that holds the drying device in place at the drying hole 583. For example, the dryer holder can be in the form of a plastic or rubber bracket that attaches to the pet washing station 500, e.g., using buttons, snaps, clips, etc. The bracket can include a sleeve or hole that holds the drying device in place.

Figure 6:
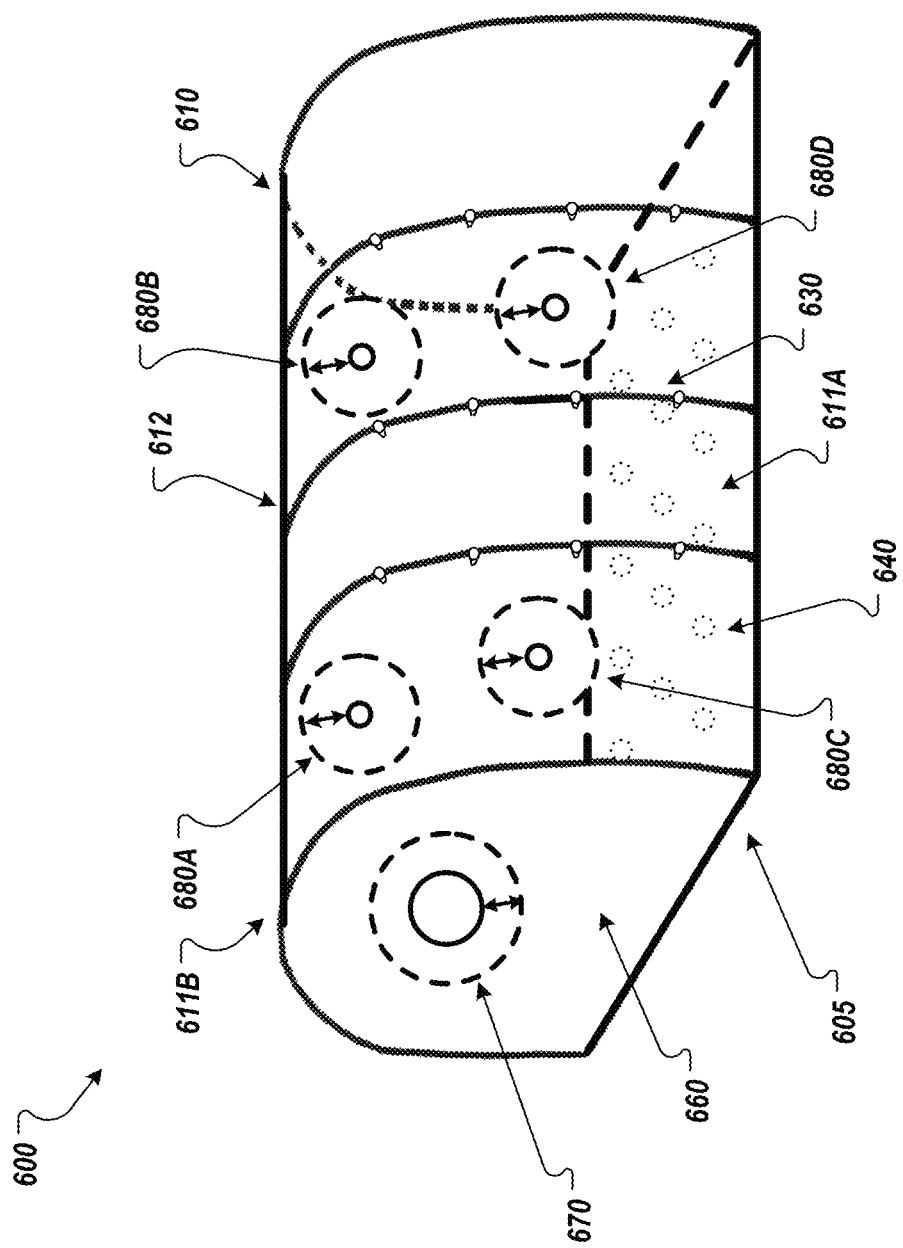
FIG. 6 is an illustration of another example portable pet washing station.

FIG. 6 is an illustration of another example portable pet washing station 600. The pet washing station 600 includes a flat bottom portion 605, a curved cover portion 610 that forms the side walls 611A and 611B and top portion 612, a door 660, a hook and loop fastener (not shown for clarity of other features) for closing the door 660, holes 640 on the bottom portion 605, and water outlets 630 along the walls 611A and 611B. The features can be the same as, or similar to, the corresponding features of the pet washing station 100 of FIG. 1.

The pet washing station 600 includes an expandable hole 670 on the door 660 and expandable holes 680A-680D on the side wall 611A. Although not shown, the pet washing station 600 can also include similar expandable holes on the side wall 611B. As described above, the expandable hole 670 on the door 660 enables a pet to poke its head out of the pet washing station 600 during a bath. The expandable holes 680A-680D enable a user to put their hands into the pet washing station 600 to wash the pet. Although the pet washing station 600 includes four expandable holes 680A-680D in this example, other quantities, such as one, two, five, or another quantity can also be used.

The expandable holes 680A-680D can be made expandable by using an elastic material to form the circumference of the expandable hole 680A-680D. In another example, the expandable holes 680A-680D can be cinch-style openings that can be opened and closed using a drawstring. In this way, the expandable holes 680A-680D that are not being used to wash the pet can be completely closed to prevent splashing. A user can open one or more of the expandable holes and reach their hand into the pet washing station to bathe a pet inside the pet washing station 600.

Figure 7:
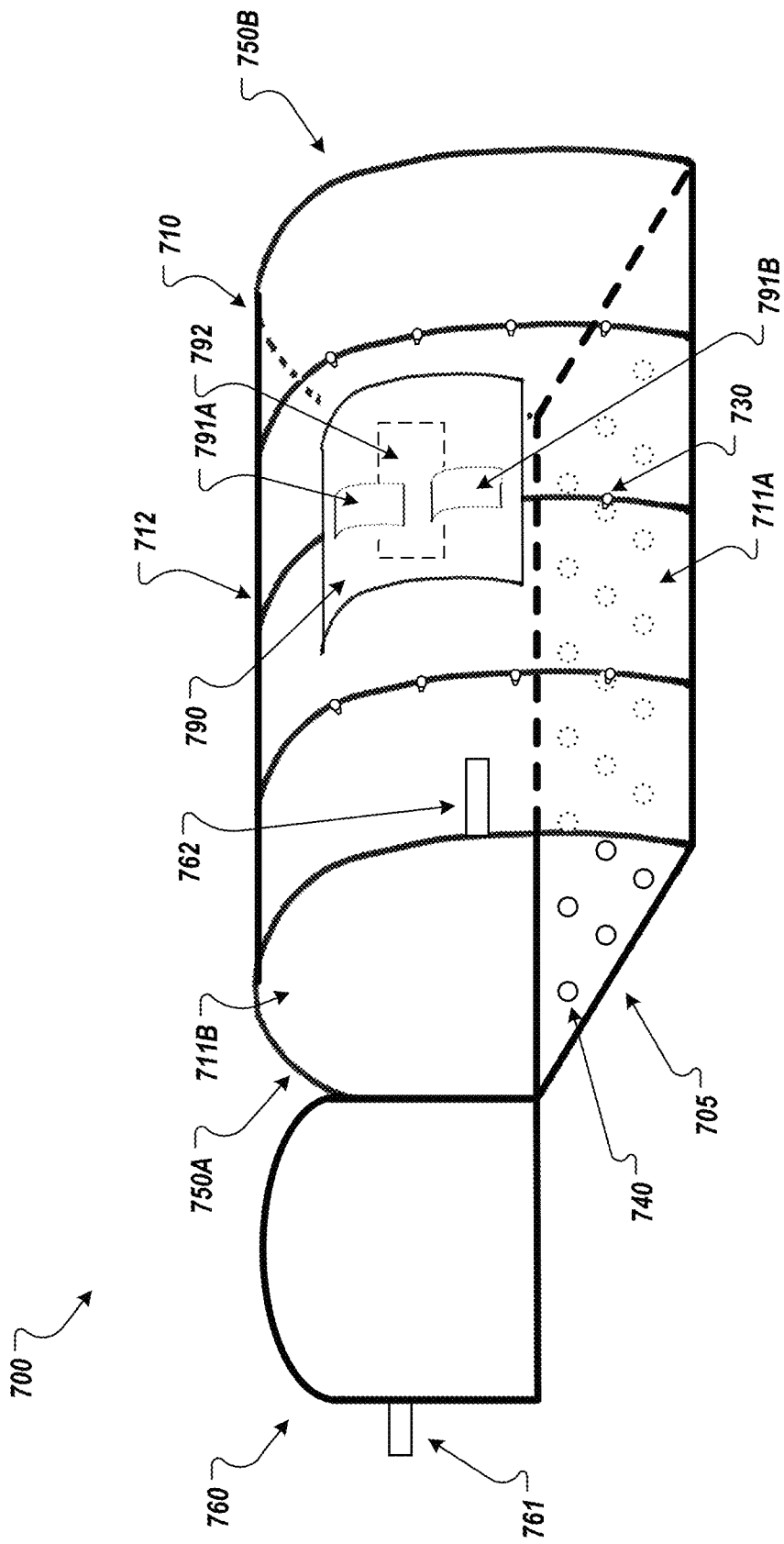
FIG. 7 is an illustration of another example portable pet washing station.

FIG. 7 is an illustration of another example portable pet washing station 700. The pet washing station 700 includes a flat bottom portion 705, a curved cover portion 710 that forms the side walls 711A and 711B and top portion 712, a door 760, a hook and loop fastener 761 and 762 for closing the door 760, holes 740 on the bottom portion 705, and water outlets 730 along the walls 711A and 711B. The features can be the same as, or similar to, the corresponding features of the pet washing station 100 of FIG. 1.

The pet washing station 700 also includes a scrubber 790 for bathing a pet inside the pet washing station 700. The scrubber 790 includes a pair of wrist straps 791A and 791B attached to an outside surface of the side wall 711A and a wash cloth 792 attached to an inside surface of the side wall 711A. A user can put their hands through the wrist straps 791A and 791B to bathe a pet inside the pet washing station 700. With hands through the wrist straps 791A and 791B, the user can press the wash cloth 792 against the pet and moves their wrists back and forth to bathe the pet. The wrist straps 791A and 791B enable the user to press the wash cloth 792 against the pet and move the wash cloth 792 about the pet without the user's hands slipping away. As the pet washing station 700 is flexible, the user can flexibly move the wash cloth 792 around by moving the housing of the pet washing station 700 using the wrist straps 791A and 792B.

The user can apply soap to the wash cloth 792 before washing the pet. In another example, the pet washing station 700 can include a hole, e.g., an expandable hole, in one of the side walls 711A or 711B to reach into the pet washing station 700 and apply the soap to the pet or to the wash cloth 792 before or during a bath. In some implementations, the scrubber 790 includes another scrubbing device, such as a sponge, in place of or in addition to the wash cloth 792. The pet washing station 700 can include a similar scrubber 790 on the other side of the pet washing station 700 such that the pet washing station 700 has two scrubbers 790 that can be pressed against the pet at the same time to bathe the pet.

Figure 8:
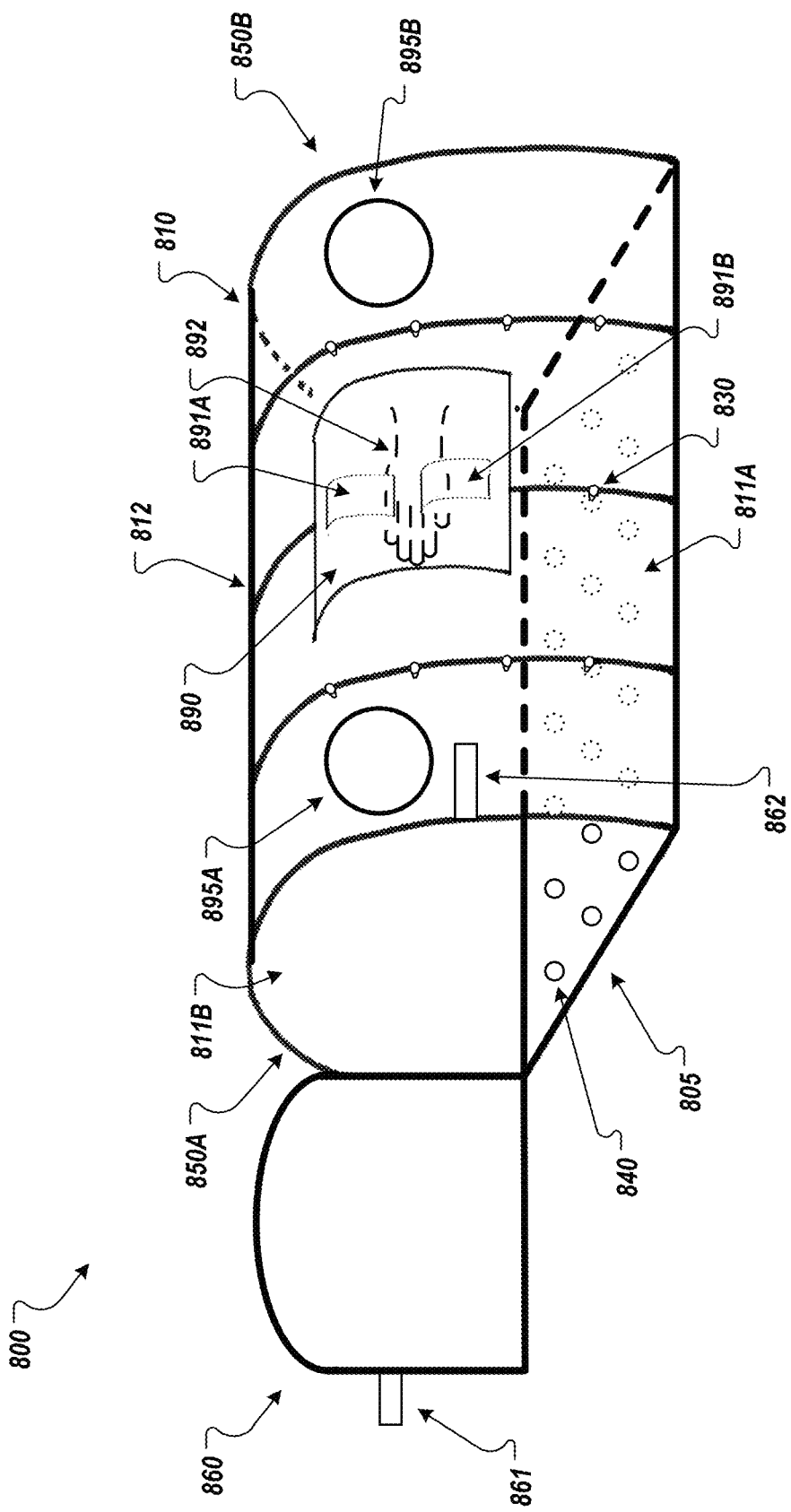
FIG. 8 is an illustration of another example portable pet washing station.

FIG. 8 is an illustration of another example portable pet washing station 800. The pet washing station 800 includes a flat bottom portion 805, a curved cover portion 810 that forms the side walls 811A and 811B and top portion 812, a door 860, a hook and loop fastener 861 and 862 for closing the door 860, holes 840 on the bottom portion 805, and water outlets 830 along the walls 811A and 811B. The features can be the same as, or similar to, the corresponding features of the pet washing station 100 of FIG. 1.

The pet washing station 800 also includes a scrubber 890 for bathing a pet inside the pet washing station 800. This example scrubber 890 includes a glove 892 on the inside of the pet washing station 800. The glove 892 can include a washing surface, such as a sponge or washing mitt similar to a car washing mitt. The glove 892 can be removably attached to the inner surface of the pet washing station 800, e.g., using hook and loop fasteners or snaps. For example, the glove 892 can include a hook fastener and the inside surface of the side wall 811A can include a loop fastener, or vice versa. The pet washing station 800 also includes holes 895A and 895B, which may be expandable using elastic or cinches. This allows users to reach into the pet washing station 800, put their hand in the glove 892, remove the glove 892 from the wall 811A, and use the glove 892 to wash the pet. The user can then reattach the glove 892 to the wall 811A after bathing the pet.

The scrubber 890 can also include wrist straps 891A and 891B, similar to the wrist straps 791A and 791B of FIG. 7. Rather than putting hands into the pet washing station 800 and removing the glove 892 to wash the pet, the users can put their hands into the wrist strap and apply the glove 892 to the pet from the outside, similar to how the wash cloth 792 is used.

FIGS. 9A, 9B, and 9C are illustrations of a foldable floor 900 for a portable pet washing station. The foldable floor 900 includes multiple floor panels 905. In this example, the foldable floor 900 includes six floor panels 905. However, other numbers of panels can be used based on the target length of the foldable floor 900 and the length of the individual floor panels 905. For example, foldable floors having more than size floor panels 905 can be used for larger pet washing stations 900, while foldable floors having fewer than six floor panels 905 can be used for smaller pet washing stations.

Adjacent floor panels 905 are connected using a hinge-like connection 910 that enables the floor panels to fold onto each other for travel and unfold (e.g., lay out) for use in the pet washing stations. For example, alternating connection points can connect adjacent floor panels 905 at a top surface of the floor panels 905. The connection points between each pair of connection points that use the top surface can have connections between the bottom surfaces of the floor panels 905.

Figure 10:
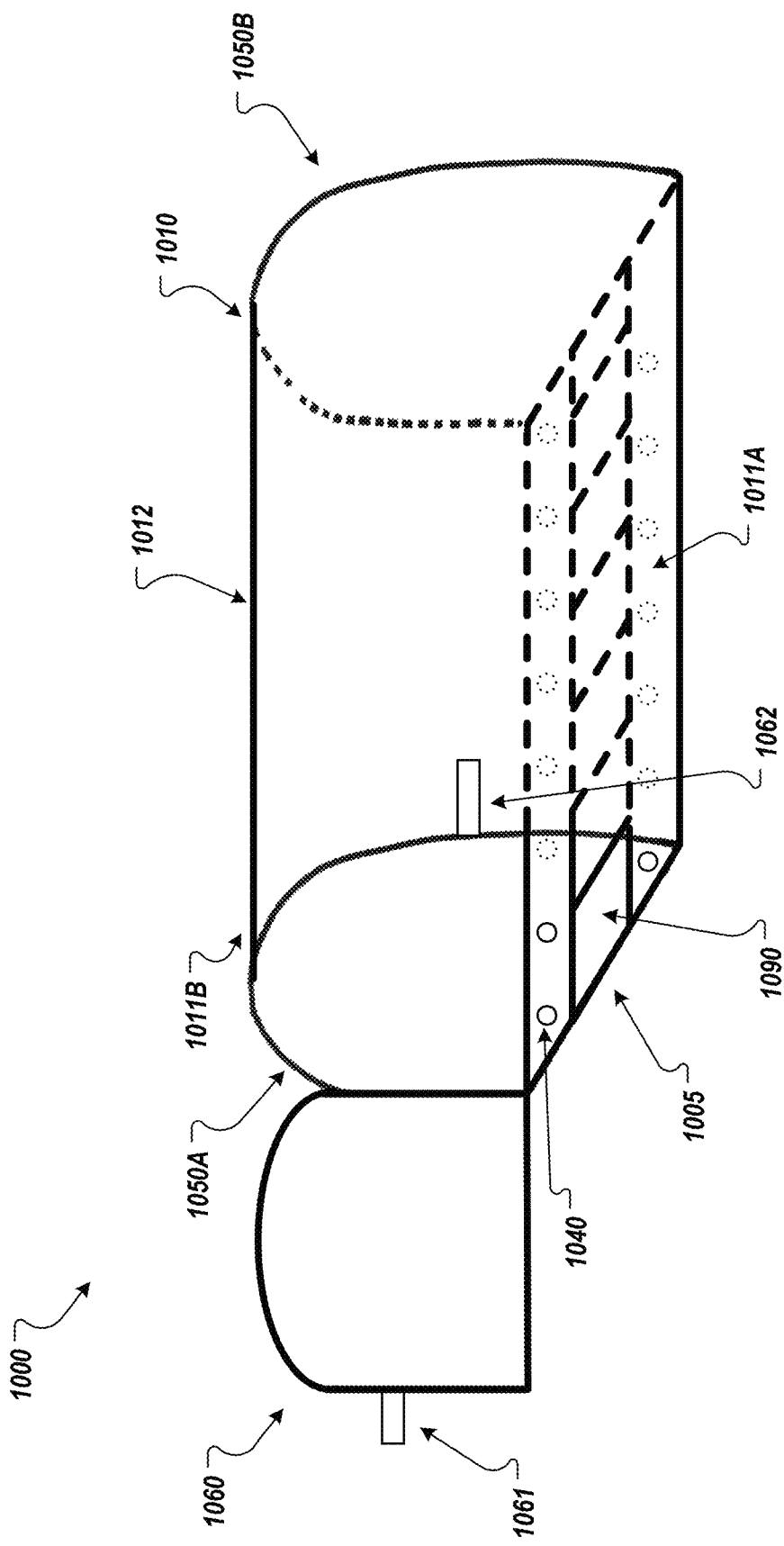
FIG. 10 is an illustration of an example portable pet washing station with a foldable floor.

The floor panels 905 can be thin pads having a waterproof outer layer. The outer layer should be made of a durable material that can withstand a pet walking on the floor panels 905. The floor panels 905 can also include an interior that has some padding for the pet's comfort, e.g., if the pet wants to lay down in the pet washing station. As the pet washing stations described in this document are portable, the pet washing station can be used on hard surfaces such as concrete outside of a hotel that may not be comfortable. When the foldable floor 900 is unfolded as shown in FIG. 9B, the foldable floor 900 can keep a pet washing station expanded, as shown in FIG. 10. When not in use, the foldable floor 900 can be folded into a compact form, as shown in FIG. 9C. This makes it easier to pack or carry when traveling.

FIG. 10 is an illustration of an example portable pet washing station 1000 with a foldable floor 1090. The foldable floor 1090 can be the same as, or similar to, the foldable floor 900 of FIG. 9. The portable pet washing station 1000 includes a flat bottom portion 1005, a curved cover portion 1010 that forms the side walls 1011A and 1011B and top portion 1012, a door 1060, a hook and loop fastener 1061 and 1062 for closing the door 1060, and holes 1040 on the bottom portion 1005. The features can be the same as, or similar to, the corresponding features of the pet washing station 100 of FIG. 1.

The size of the foldable floor 1090 can be selected such that, when unfolded, the foldable floor 1090 extends across the length of the bottom 1005 of the pet washing station 1000 from one side 1050A to the other side 1050B. On either side 1050A and 1050B of the pet washing station 1000, the bottom 1005 can include a lip, short wall, or other protrusion that the foldable floor 1090 presses against to keep the pet washing station 1000 expanded. This protrusion can extend upwards from the bottom 1005 a short distance, e.g., less than an inch. The protrusion can extend from the side wall 1011A to the side wall 1011B across both sides 1050A and 1050B of the bottom 1005. A user can unfold the foldable floor 1090, put the foldable floor in the pet washing station 1000, place one end of the foldable floor 1090 against the protrusion on one side (1050A or 1050B) of the pet washing station 1000, and place the other end of the foldable floor 1090 against the protrusion on the other side (1050A or 1050B0 of the pet washing station 1000). This prevents a tension coil spring from collapsing the pet washing station 1000 and provides a comfortable surface for the pet during a bath.

Figure 11:
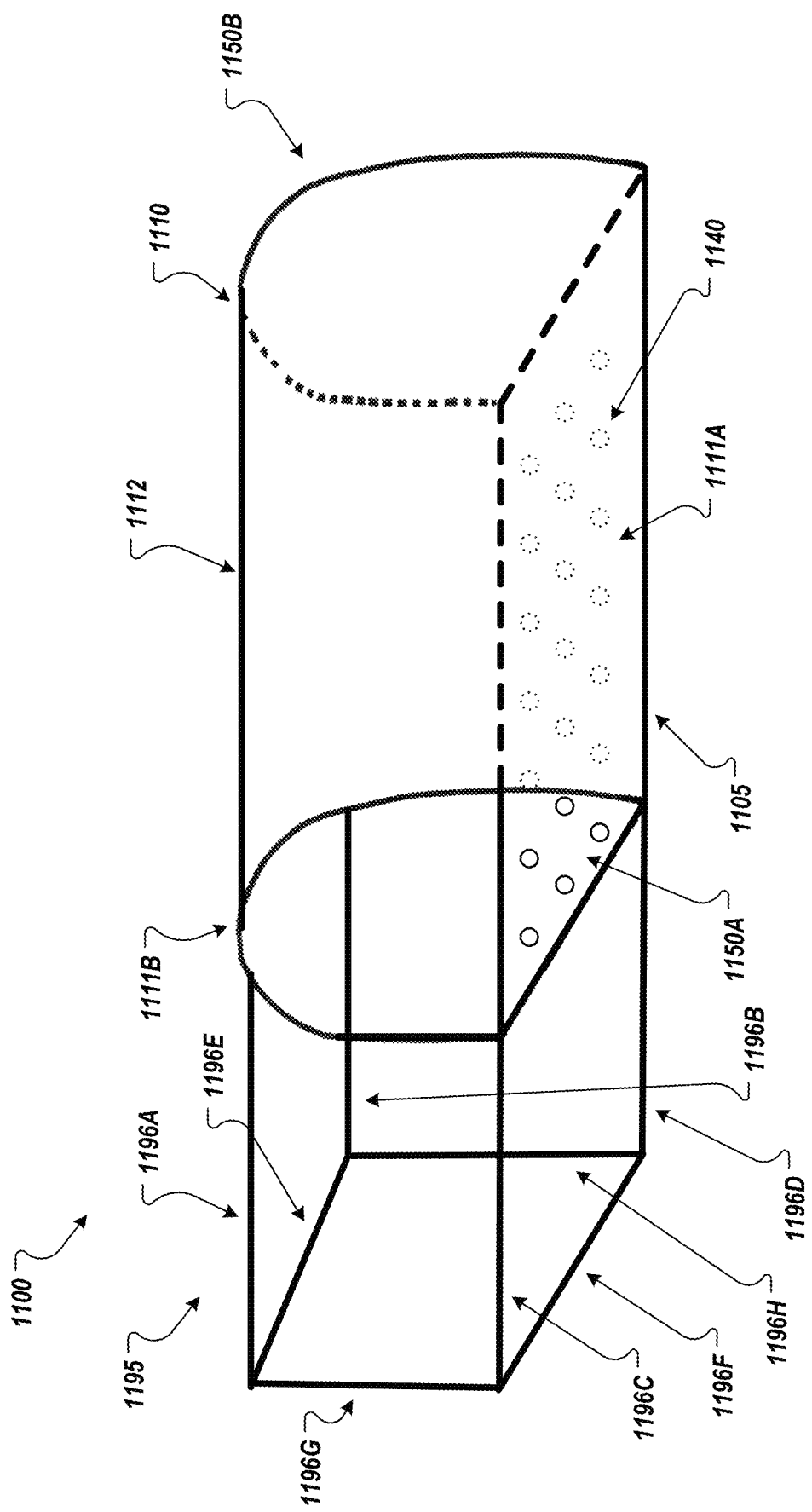
FIG. 11 is an illustration of an example portable pet washing station with a drying station.

FIG. 11 is an illustration of an example portable pet washing station 1100 with a drying station 1195. The portable pet washing station 1100 includes a flat bottom portion 1105, a curved cover portion 1110 that forms the side walls 1111A and 1111B and top portion 1112, and holes 1140 on the bottom portion 1105. The features can be the same as, or similar to, the corresponding features of the pet washing station 100 of FIG. 1. The pet washing station 1100 can also include water outlets along the side walls, slots, expandable holes, sleeves, gloves, scrubbers, and/or other features described above.

The drying station 1195 is made of bars 1196A-1196H, e.g., metal or plastic bars, that form a cube or rectangular cuboid shape. The bars 1196A-1196D can be removably attached to the side walls 1111A and 1111B on the side 1150A of the pet washing station 1100, e.g., using clips. In another example, a user can place the drying station 1195 beside the side 1150A of the pet washing station 1100 without attaching it to the pet washing station 1100.

The user can place a towel over the top bars 1196A, 1196B, and 1196E. When the pet walks out of the pet washing station 1100 and into the drying station 1195, the user can apply the towel to the pet to dry the pet. In this position, the towel prevents the pet from shaking water outside of the drying station 1195 when the pet walks out of the pet washing station 1100.

The bars 1196A-1196H of the drying station 1195 can be connected to the other bars 1196-1196H using hinged connections so that the drying station 1195 can fold into a more compact form for traveling. For example, the connection between the bar 1196B and 1196H can include a hinge such that the bar 1196B can fold down and be parallel with the bar 1196H. A similar hinge can be used for the bars 1196D and 1196H, the bars 1196A and 1196G, and the bars 1196C and 1196G.

Figure 12:
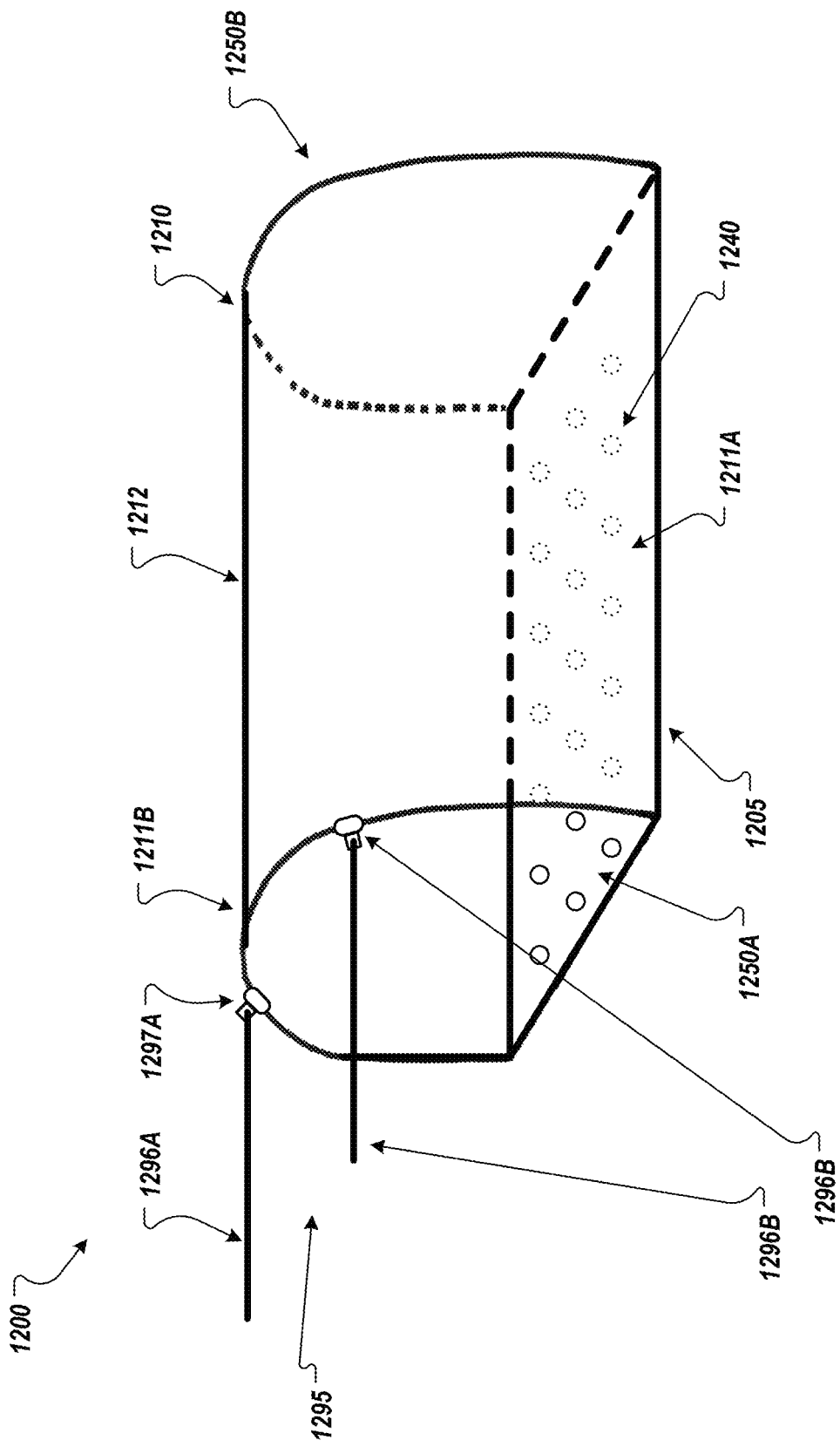
FIG. 12 is an illustration of an example portable pet washing station with a drying station.

FIG. 12 is an illustration of an example portable pet washing station 1200 with a drying station 1295. The portable pet washing station 1200 includes a flat bottom portion 1205, a curved cover portion 1210 that forms the side walls 1211A and 1211B and top portion 1212, and holes 1240 on the bottom portion 1205. The features can be the same as, or similar to, the corresponding features of the pet washing station 100 of FIG. 1. The pet washing station 1200 can also include water outlets along the side walls, slots, expandable holes, sleeves, gloves, scrubbers, and/or other features described above.

The example drying station 1295 includes two rods 1296A and 1296B attached to the pet washing station 1200. For example, the rods 1296A and 1296B can include spring-loaded clips 1297A and 1297B, respectively, for attaching the rods 1296A and 1296B to the pet washing station 1200. The rods 1296A and 1296B can be rigid or flexible, e.g., that can be flexed into various shapes similar to a night reading light. The rods 1296A and 1296B can be about 2-3 feet long, or another appropriate length, to hold a towel over the pet when the pet leaves the pet washing station 1200. Although two rods 1296A and 1296B are illustrated in this example, one rod, or more than two rods can also be used.

For example, a user can attach one or more rods 1296A and 1296B to the pet washing station 1200 before bathing a pet or before letting the pet out of pet washing station 1200. The user can drape a towel over the rod(s) and allow the pet to leave the pet washing station 1200. When the pet goes under the towel, the user can apply the towel to the pet to dry the pet. When finished, the user can remove the rods 1296A and 1296B from the pet washing station 1200 and collapse the pet washing station 1200.

Figure 13:
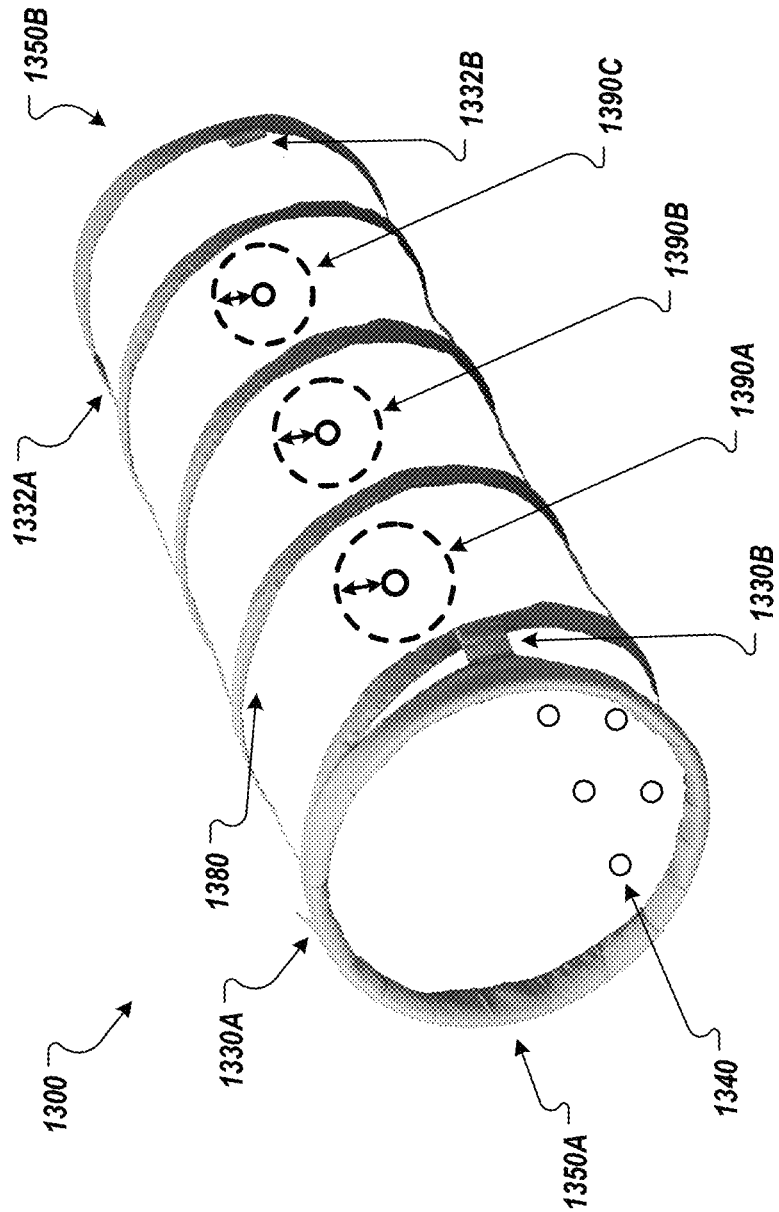
FIG. 13 is an illustration of another example portable pet washing station.

FIG. 13 is an illustration of another example portable pet washing station 1300. In this example, the pet washing station 1300 is shaped like a tube. The pet washing station 1300 can be made of a flexible and/or waterproof material, such as a nylon material.

The pet washing station 1300 includes a coil spring 1380. The coil spring 1380 can be a compression coil spring that resists compression, as described above. The coil spring 1380 can extend from one side 1350A of the pet washing station 1300 to the other side 1350B of the pet washing station 1300. The coil spring 1380 can be embedded in the fabric of the pet washing station 1300, similar to the coil spring 280 of FIG. 2. In another example, the coil spring 1380 can be attached to the outer or inner surface of the pet washing station 1300.

As a compression spring, the coil spring 1380 naturally tries to expand rather than collapse. Thus, the pet washing station 1300 can be used without a foldable floor or other mechanism for keeping the pet washing station 1300 expanded. When not in use, the user can push the two sides 1350A and 1350B of the pet washing station 1300 together and compress the coil spring 1380. The pet washing station 1300 can include attachment mechanisms to keep the pet washing station 1300 in is compact, collapsed form. In this example, the pet washing station 1300 includes hook and loop fasteners on the sides 1350A and 1350B of the pet washing station 1300. In particular, the pet washing station 1300 includes panels 1330A and 1330B on the side 1350A with either hooks or loops and the pet washing station 1300 includes panels 1332A and 1332B with the other of hooks or loops on the other side 1350B. The user can collapse the pet washing station 1300 and press the panels 1330A and 1332A together and press the panels 1330B and 1332B together. This prevents the coil spring 1380 from expanding the pet washing station 1300 until the user unfastens the hook and loop fasteners. Other quantities of hook and loop fasteners can also be used. Similarly, other types of attachment mechanisms can be used, such as adhesives, strings and loops, etc.

The coil spring 1380 can be configured to provide a small amount of tension to expand, e.g. by having less than a threshold spring rate, so that the coil spring 1380 does not suddenly expand the pet washing station 1300 when the user unfastens the hook and loop fasteners. Instead, the pet washing station 1320 can gradually expand when unfastened. This also makes it easier for the user to compress for storage or travel.

The pet washing station 1300 can include features of the pet washing stations described above. For example, the pet washing station 1300 can include water outlets (not shown), holes 1340 on a portion of the pet washing station 1300 that will rest against the ground or other surface, one or more door(s), expandable holes 1390A-1390C that users can put their hands through to bathe a pet, sleeves (not shown) that extend into the pet washing station 1300, gloves (not shown) that extend into the pet washing station 1300, a foldable floor for comfort, and/or a drying station.

The pet washing stations described above can include various combinations of the features described above. For example, a pet washing station can include gloves similar to the gloves 581A and 581B of FIG. 5 and expandable holes along the other side of the pet washing station. In another example, a pet washing station can include gloves similar to the gloves 581A and 581B of FIG. 5 and a scrubber similar to the scrubber 790 of FIG. 7.

Figure 14:
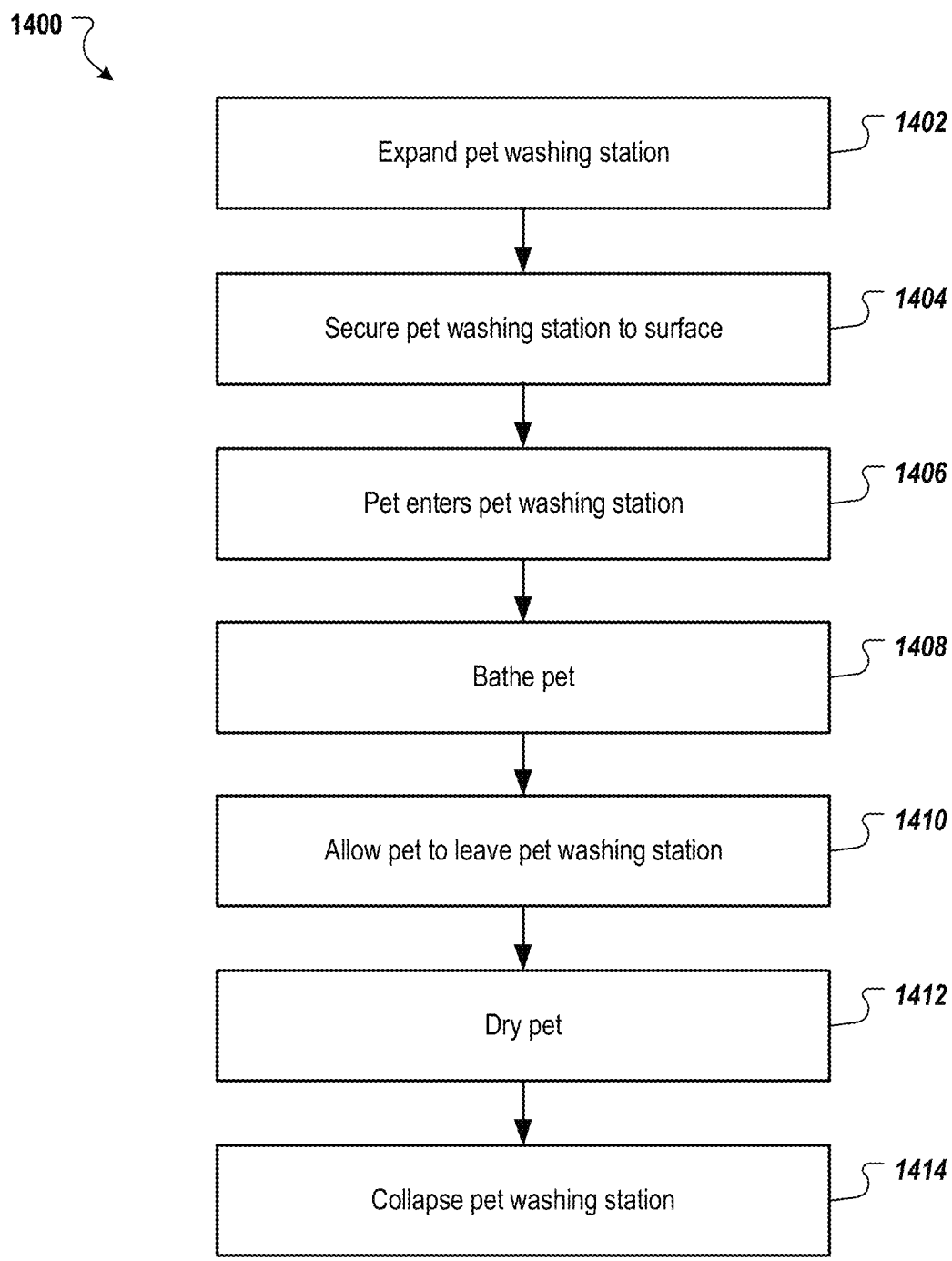
FIG. 14 is a flow diagram of an example process for bathing a pet in a portable pet washing station.

FIG. 14 is a flow diagram of an example process 1400 for bathing a pet in a portable pet washing station. The example process can be performed using any one of the pet washing stations illustrated in FIGS. 1-8 and 10-13 and described above.

A pet washing station is expanded (1402). A person can expand the pet washing station from its compressed or compact form. If the pet washing station includes a tension spring, the user can pull the sides of the pet washing station apart. The user can then place a foldable floor in the pet washing station to prevent the tension spring from collapsing the pet washing station. If the pet washing station includes a compression spring, the user can release the attachment mechanisms, e.g., pull the hook and loop fasteners apart, and allow the compression spring to expand the pet washing station.

The pet washing station is secured to a surface (1404). As described above, the pet washing station can include suction cups attached to the bottom of the pet washing station. In this example, the user can expand the pet washing station completely and push the suction cups against the surface to secure bottom of the pet washing station to the surface. The surface can be the ground, a floor, a sidewalk, etc. Attachment mechanisms other than suction cups can also be used. For example, stakes can be placed through holes in flaps connected to the pet washing station. The stakes can then be pushed into the ground to hold the pet washing station in place.

A pet enters the pet washing station (1406). A user can open a door on the pet washing station and guide the pet through the door. The user can then close the door to keep the pet within the pet washing station during bathing. If the pet washing station includes a leash, the user can connect the leash to a collar worn by the pet. If the pet washing station includes an expandable hole for the pet to put its head out of the pet washing station, the user can encourage the pet to put its head through the hole, then adjust the size of the hole such that the pet cannot escape through the hole, but the pet can comfortably place its head through the hole.

The pet is bathed (1408). One or more of the features described above can be used to bathe the pet. For example, a user can put the end of a hose through one of the slots to wet the pet. The user could connect a hose to the coil spring (or other water tube) and turn the water on such that water flows through the water tube and through water outlets disposed along the walls and/or top portion of the pet washing station. The user can then apply soap to the pet, e.g., through a hole in one of the sides of the pet washing station. The user can then bathe the pet using gloves, wash cloths, sleeves, or holes in the side of the pet washing station.

For example, if the pet washing station includes gloves that extend into the pet washing station, the user can put their hands into the gloves and bathe the pet using the gloves. In another example, if the pet washing station includes a wash cloth attached to the inner wall of the pet washing station, the user can push the sides of the pet washing station towards the pet such that the wash cloth touched the pet. The user can then use the wrist straps to move the wash cloth along the pet's fur to scrub the pet. After bathing the pet, the user can rinse the pet using the hose through one of the slots or by running water through the water outlets.

The pet is allowed to leave the pet washing station (1410). For example, the user can open the door to the pet washing station to allow the pet to walk out of the pet washing station. If a leash of the pet washing station is used, the user can leave the leash attached, e.g., while drying the pet as described below, or remove the leash from the pet's collar.

The pet is dried (1412). As described above, the pet washing station can include a drying station that holds a towel above and to the sides of the pet. In this way, if the pet attempts to shake itself dry, the towel can block the water from making a mess outside of the drying station. In this example, the pet can walk out of the door of the pet washing station into the drying station. The user can then dry the pet using the towel.

If the pet washing station does not include a drying station, the user can use a towel to dry the pet after it walks out of the pet washing station. Or, the user can attempt to dry the pet within the pet washing station. In another example, the user may simply let the pet shake itself dry, e.g., if the pet washing station is used outside.

The pet washing station is collapsed (1414). If the pet washing station includes a tension spring, the user can remove the foldable floor and allow the tension spring to collapse the pet washing station. If the pet washing station includes a compression spring, the user can push the two sides of the pet washing station together. The user can then secure the pet washing station in collapsed form using the attachment mechanisms, e.g., attaching the hook and loop fasteners to each other.

Figure 15:
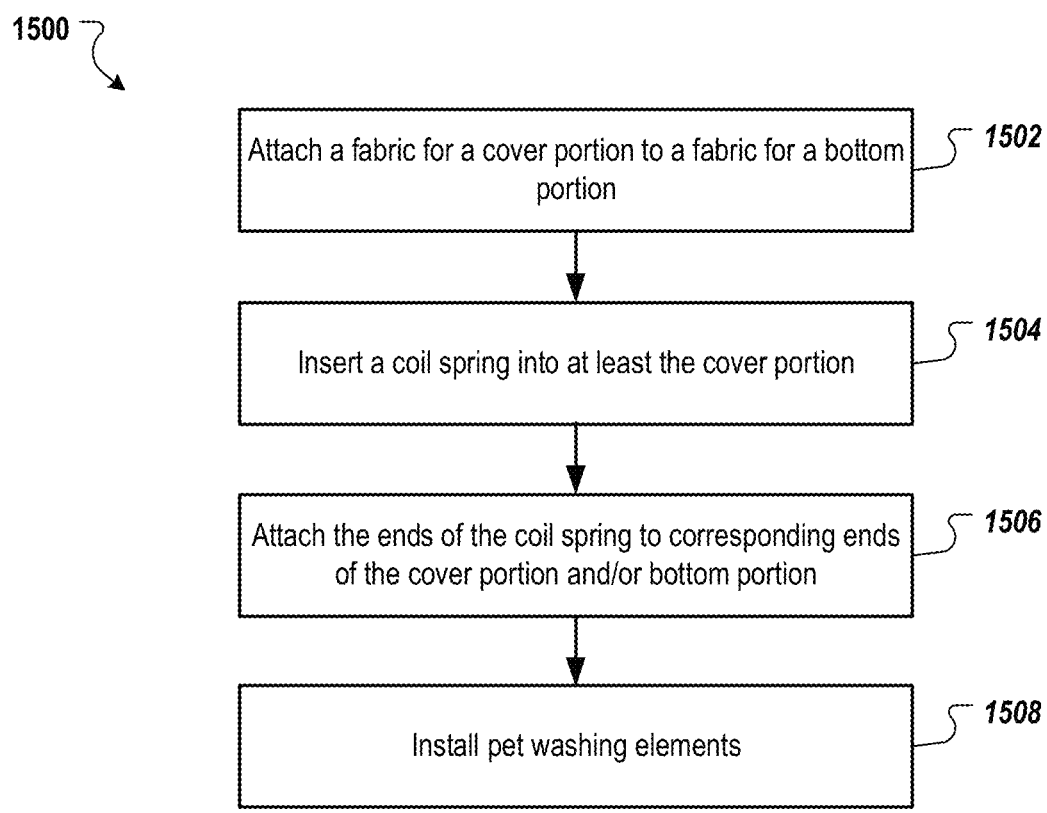
FIG. 15 is a flow diagram of an example process for manufacturing a portable pet washing station.

FIG. 15 is a flow diagram of an example process 1500 for manufacturing a portable pet washing station. The process 1500 can be used to manufacture any of the pet washing stations described above. The process 1500 can be performed by manufacturing equipment, e.g., sewing machine(s) and/or robot arms.

A fabric for a cover portion is attached to a fabric for a bottom portion (1502). As described above, the fabrics can be made of a flexible and/or water resistant or waterproof material. The cover portion can be attached to the bottom portion by sewing or stitching two ends of the cover portion to two corresponding ends of the bottom portion. In another example, the two ends of the cover portion can be attached to the two ends of the bottom portion using hook and loop fasteners (e.g., to enable the cover portion to be separated from the bottom portion), zippers, adhesives, buttons, clips, snaps, etc.

A coil spring is inserted into at least the cover portion (1504). For example, a person or a robot arm can feed one end of the coil spring through the cover portion and optionally the bottom portion. The coil spring can be fed through two or more layers of the fabric of the cover portion and optionally the bottom portion.

The ends of the coil spring are attached to corresponding ends of the cover portion or the bottom portion (1506). One end of the coil spring can be attached to an end of the cover portion or bottom portion as one side of the pet washing station and the other end of the coil spring can be attached to an end of the cover portion or bottom portion at a second side of the pet washing station opposite the first side of the pet washing station. The ends of the coil spring can be attached to the fabric of the cover portion or bottom portion using adhesives, looping the end of the coil spring around a loop in the fabric, looping a portion of the fabric around a loop at the end of the coil spring, snapping a snap at the end of the coil spring to a snap attached to the fabric, and/or using another appropriate attachment mechanism.

Pet washing elements are installed (1508). The pet washing elements can include expandable holes, gloves, sleeves, wash cloths, scrubbers, etc. Pet washing elements can be installed before or after installing the coil spring in the fabric. For example, holes can be cut out of the fabric before or after installing the coil spring.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A portable pet washing station configured to be collapsed for storage and travel, and expand when used to bathe a pet, the portable pet washing station comprising:
    a bottom portion that extends from a first side of the pet washing station to a second side of the pet washing station opposite of the first side of the pet washing station;
    a cover portion connected to the bottom portion and that forms a top portion and side wall portions, wherein the cover portion extends from the first side of the pet washing station to the second side of the pet washing station, wherein the bottom portion and the cover portion comprise,
        an outer layer facing outside of the pet washing station, and
        an inner layer facing inside of the pet washing station, wherein the inner layer comprises elastic holes;
    a coil spring disposed between the outer and inner layers of the bottom portion and the cover portion, wherein the coil spring extends from the first side of the pet washing station to the second side of the pet washing station; and
    a water tube that runs within the outer and inner layers, wherein the coil spring comprises,
        a plurality of water outlets arranged to correspond to locations of respective elastic holes in the inner layer of the pet washing station such that water flows through the water tube, out of the walls, and onto the pet, wherein,
        the coil spring is hollow,
        the coil spring includes the plurality of water outlets, and
        each water outlet comprises a nozzle that is inserted through the respective hole for the water outlet and held in a position using the elastic hole that expands to go around the nozzle and collapses into a slot behind the nozzle to prevent the nozzle from retreating through the elastic hole.

2. The portable pet washing station of claim 1, wherein the coil spring is a tension spring configured to pull the first side of the pet washing station and the second side of the pet washing station together.

3. The portable pet washing station of claim 2, further comprising a foldable floor removably inserted into the pet washing station and onto the bottom portion of the pet washing station such that, when expanded, the foldable floor prevents the coil spring from collapsing the pet washing station.

4. The portable pet washing station of claim 1, wherein the coil spring includes a plurality of holes for air to flow and a fitting or adapter for receiving a drying device.

5. The portable pet washing station of claim 1, wherein the coil spring is a compression spring configured to push the first side of the pet washing station away from the second side of the pet washing station.

6. The portable pet washing station of claim 5, further comprising one or more hook and loop fasteners that hold the first side and the second side together when the pet washing station is collapsed.

7. The portable pet washing station of claim 1, wherein the coil spring comprises a helical spring.

8. The portable pet washing station of claim 1, wherein the coil spring comprises multiple flat sections that run along the bottom portion and multiple curved sections that run along the cover portion.

9. The portable pet washing station of claim 1, further comprising a door on at least one of the first side or the second side, wherein the door comprises an expandable hole.

10. The portable pet washing station of claim 1, wherein the plurality of water outlets are disposed along the side wall portions.

11. The portable pet washing station of claim 10, wherein:
    the coil spring includes a fitting for receiving a water hose.

12. The portable pet washing station of claim 1, further comprising one or more expandable holes disposed along the cover portion.

13. The portable pet washing station of claim 1, wherein the cover portion includes one or more sleeve holes and, for each sleeve hole, a sleeve that extends into the pet washing station from the sleeve hole.

14. The portable pet washing station of claim 1, wherein the cover portion includes one or more glove holes and, for each glove hole, a glove that extends into the pet washing station from the glove hole.

15. The portable pet washing station of claim 1, further comprising a plurality of holes in the bottom portion.

16. The portable pet washing station of claim 1, further comprising a scrubber that comprises:
    a pair of wrist straps attached to an outside surface of a side wall portion; and
    a wash cloth attached to an inside surface of the side wall.

17. The portable pet washing station of claim 1, further comprising a plurality of suction cups attached to the bottom portion.

18. The portable pet washing station of claim 1, further comprising a leash attached to the bottom portion or the cover portion.

19. A method for manufacturing a portable pet washing station configured to be collapsed for storage and travel, and expand when used to bathe a pet, the method comprising:
    attaching a cover portion of the portable pet washing station to a bottom portion of the pet washing station, wherein the bottom portion and the cover portion comprise,
        an outer layer facing outside of the pet washing station, and an inner layer facing inside of the pet washing station, wherein the inner layer comprises elastic holes;

installing a coil spring into the outer and inner layers of the bottom portion and the cover portion, wherein the coil spring extends from a first side of the pet washing station to a second side of the pet washing station;

inserting, within the outer and inner layers of the bottom portion and the cover portion, a water tube that runs within the outer and inner layers of the bottom portion and the cover portion; and attaching each end of the coil spring to corresponding ends of at least one of the cover portion or the bottom portion, wherein the coil spring comprises, a plurality of water outlets arranged to correspond to locations of respective elastic holes in the inner layer of the pet washing station such that water flows through the water tube, out of the walls, and onto the pet, wherein, the coil spring is hollow, the coil spring includes the plurality of water outlets, and each water outlet comprises a nozzle that is inserted through the respective hole for the water outlet and held in a position using the elastic hole that expands to go around the nozzle and collapses into a slot behind the nozzle to prevent the nozzle from retreating through the elastic hole.

\* \* \* \* \*